United States Patent
Yasuda et al.

(10) Patent No.: US 10,466,577 B2
(45) Date of Patent: Nov. 5, 2019

(54) PROJECTOR

(71) Applicant: SEIKO EPSON CORPORATION, Tokyo (JP)

(72) Inventors: Masanori Yasuda, Matsumoto (JP); Toshihiko Nagumo, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/045,100

(22) Filed: Jul. 25, 2018

(65) Prior Publication Data

US 2019/0041740 A1    Feb. 7, 2019

(30) Foreign Application Priority Data

Aug. 2, 2017    (JP) ................. 2017-149709

(51) Int. Cl.
*G03B 21/28*    (2006.01)
*G03B 33/12*    (2006.01)
*G03B 21/20*    (2006.01)

(52) U.S. Cl.
CPC .......... *G03B 21/28* (2013.01); *G03B 21/204* (2013.01); *G03B 21/208* (2013.01); *G03B 21/2066* (2013.01); *G03B 21/2073* (2013.01); *G03B 33/12* (2013.01)

(58) Field of Classification Search
CPC ........ G03B 21/20; G03B 21/28; G03B 33/12; G03B 21/14; G03B 21/00; F21V 9/14; G02F 1/13; F21Y 101/02; F21S 2/00
See application file for complete search history.

(56) References Cited

U.S. PATENT DOCUMENTS

| | | | |
|---|---|---|---|
| 6,471,357 B1 | 10/2002 | Hara et al. | |
| 8,733,940 B2 | 5/2014 | Tanaka et al. | |
| 2004/0201827 A1* | 10/2004 | Kojima | ................ H04N 9/3117 353/81 |
| 2012/0140183 A1 | 6/2012 | Tanaka et al. | |

FOREIGN PATENT DOCUMENTS

| | | |
|---|---|---|
| JP | 3678062 B2 | 8/2005 |
| JP | 2012-137744 A | 7/2012 |

* cited by examiner

*Primary Examiner* — Cara E Rakowski
*Assistant Examiner* — Danell L Owens
(74) *Attorney, Agent, or Firm* — Oliff PLC

(57) ABSTRACT

A projector includes an illumination device adapted to emit an illumination light beam, an image forming device adapted to modulate the illumination light beam emitted from the illumination device to form an image, a projection optical device adapted to project the image formed by the image forming device, and a light guide device adapted to guide the illumination light beam emitted from the illumination device to the image forming device, and defining two directions which are propagation directions of the illumination light beam propagating inside the image forming device, and cross each other as a first direction and a second direction, the image forming device is disposed so that at least a part of the image forming device overlaps at least a part of the illumination device in a third direction perpendicular to each of the first direction and the second direction.

16 Claims, 21 Drawing Sheets

PROJECTOR

BACKGROUND

1. Technical Field

The present invention relates to a projector.

2. Related Art

In the past, there has been known a projector which forms and then projects an image corresponding to image information. As such a projector, there is known a projector provided with a light source device, a first lens array plate, a second lens array plate, a polarization conversion optical element, a superimposing lens, two dielectric mirrors, three field lenses, three incident side polarization plates, three liquid crystal panels, three emission side polarization plates, a color combining prism, and a projection lens (see, e.g., JP-A-2012-137744 (Document 1)).

In the projector described in Document 1, the light source device is provided with a solid-state light source unit, a dichroic mirror, a fluorescence emitting plate, and a polarization direction conversion section. In this light source device, out of the blue light emitted from the solid-state light source unit, the s-polarization component is reflected by the dichroic mirror, and the p-polarization component is transmitted. The s-polarization component enters the fluorescence emitting plate, the fluorescence emitting plate emits the fluorescence, and the p-polarization component is converted by the polarization direction conversion section into the s-polarized light. The fluorescence and the s-polarized light are emitted by the dichroic mirror toward the same direction as illumination light.

Then, the illumination light passes through the first lens array plate, the second lens array plate, the polarization conversion optical element, and the overlapping lens, and then enters one of the two dichroic mirrors. The one of the dichroic mirrors reflects blue light and transmits green light and red light, and the other of the dichroic mirrors reflects the green light and transmits the red light. The colored light beams of blue, green, and red separated from each other in such a manner enter the corresponding liquid crystal panels via the corresponding field lenses and incident side polarization plates, respectively. The colored light beams respectively modulated by these liquid crystal panels enter the color combining prism via the corresponding emission side polarization plates. The color combining prism combines these colored light beams with each other to form image light, and the image light is projected by the projection lens.

Incidentally, in the projector described in Document 1 described above, the two dichroic mirrors and the reflecting mirror are disposed in the emission direction of the illumination light by the light source device in addition to the lens array plates, the polarization conversion optical element and the superimposing lens. In other words, the optical components constituting the projector are arranged two-dimensionally. Therefore, there is a problem that the area (the installation area) occupied by the projector is large in the case of viewing the projector along a direction crossing each of the projection direction of the image by the projection lens and the emission direction of the illumination light by the light source device.

Such a problem becomes a factor for hindering the change in posture of the projector when adjusting the projection position or changing the aspect ratio of the image to be projected to degrade the handling of the projector.

SUMMARY

An advantage of some aspects of the invention is to provide a projector the installation area of which can be reduced.

A projector according to an aspect of the invention includes an illumination device adapted to emit an illumination light beam, an image forming device adapted to modulate the illumination light beam emitted from the illumination device to form an image, a projection optical device adapted to project the image formed by the image forming device, and a light guide device adapted to guide the illumination light beam emitted from the illumination device to the image forming device, and defining two directions which are propagation directions of the illumination light beam propagating inside the image forming device, and cross each other as a first direction and a second direction, the image forming device is disposed so that a part of the image forming device overlaps a part of the illumination device in a third direction perpendicular to each of the first direction and the second direction.

According to such a configuration, it is possible to provide the projector with a two-story structure in which the illumination device is disposed in the first floor part, and the image forming device is disposed in the second floor part located in the third direction with respect to the first floor part. According to this configuration, it is possible to reduce the area occupied by the illumination device and the image forming device in the case of being viewed along the third direction compared to the case of arranging the illumination device and the image forming device on the same plane. Therefore, it is possible to reduce the configuration area of the projector.

In the aspect of the invention described above, it is preferable that the first direction is parallel to a projection direction of the image by the projection optical device viewed along the third direction, and the light guide device emits the illumination light beam which has been emitted from the illumination device toward an opposite direction side to the first direction toward the first direction side to guide the illumination light beam to the image forming device.

It should be noted that the expression "parallel to the projection direction" includes not only the case in which the projection direction is in a completely parallel state to either one of the first direction and the second direction, but also the case in which they are roughly parallel to each other.

According to such a configuration, among the illumination device and the image forming device disposed in a state of at least partially overlapping each other in the third direction described above, the illumination light beam emitted from the illumination device toward the opposite direction side to the projection direction described above can surely be made to enter the image forming device due to the function of the light guide device described above.

In the aspect of the invention described above, it is preferable that the image forming device includes a color separation device adapted to separate the illumination light beam entering the color separation device into a plurality of colored light beams, a plurality of light modulation devices disposed corresponding to the plurality of colored light beams separated by the color separation device, and a color combining device adapted to combine the plurality of colored light beams entering the color combining device from the plurality of light modulation devices with each other to form the image, and the color separation device includes a first color separation element adapted to separate the illumination light beam into a first colored light beam propagating in the first direction and another colored light beam propagating in the second direction out of the plurality of colored light beams, and a second color separation element adapted to separate the another colored light beam separated by the first color separation element into a second colored light beam propagating in the first direction and a third colored light beam propagating in the second direction.

According to such a configuration, it is possible to define the first direction and the second direction described above as the propagation directions of the first through third colored light beams separated from the illumination light beam by the color separation device. Further, since the image forming device is located on the third direction described above with respect to the illumination device, it is possible to design the optical system of the image forming device independently of that of the illumination device.

In the aspect of the invention described above, it is preferable that the image forming device is provided with a homogenizing device disposed on a light path of the illumination light beam entering the color separation device from the light guide device, and adapted to homogenize an illuminance distribution of the illumination light beam entering the homogenizing device from the light guide device and uniform a polarization direction.

According to such a configuration, the colored light beams homogenized in illuminance distribution and polarization direction are made to enter the respective light modulation devices. Thus, it is possible to prevent the color shading and deterioration in contrast from occurring in the image formed by the image forming device, namely the image to be projected by the projection optical device.

Further, in the case in which the illumination device is larger than the image forming device (in other words, in the case in which the configuration area of the illumination device is larger than the configuration area of the image forming device), since the image forming device includes the homogenizing device described above, it is possible to make it easy to uniform the areas occupied by the illumination device and the image forming device in the case of being viewed along the third direction. Therefore, it is possible to further miniaturize the projector.

In the aspect of the invention described above, it is preferable to include a homogenizing device disposed on a light path of the illumination light beam entering the light guide device from the illumination device, and adapted to homogenize an illuminance distribution of the illumination light beam entering the homogenizing device from the illumination device and uniform a polarization direction.

According to such a configuration, as described above, since it is possible to make the colored light beams homogenized in illuminance distribution and polarization direction enter the plurality of light modulation devices, it is possible to prevent the color shading and deterioration in contrast from occurring in the image to be formed and then projected.

Further, in the case of the configuration in which the light guide device guides the illumination light beam from the illumination device to the image forming device using reflection, by the homogenizing device uniforming the illumination light beam to the polarized light high in reflection efficiency in the light guide device, it is possible to improve the utilization efficiency of the light beam in the image forming device.

In the aspect of the invention described above, it is preferable that there are further included a first reflecting member adapted to reflect the third colored light beam which has been separated by the color separation device and propagates in the second direction toward the first direction, and a second reflecting member adapted to reflect the third colored light beam which has been reflected by the first reflecting member and propagates in the first direction toward an opposite direction to the second direction, the color separation device includes a third reflecting member adapted to reflect the first colored light beam which propagates from the first color separation element in the first direction toward the second direction, the plurality of light modulation devices includes a first light modulation device adapted to modulate the first colored light beam entering the first light modulation device along the second direction, a second light modulation device adapted to modulate the second colored light beam entering the second light modulation device along the first direction, and a third light modulation device adapted to modulate the third colored light beam entering the third light modulation device along an opposite direction to the second direction, and the color combining device includes a first plane of incidence which crosses the second direction, and which the first colored light beam modulated by the first light modulation device enters, a second plane of incidence which crosses the first direction, and which the second colored light beam modulated by the second light modulation device enters, a third plane of incidence which crosses the second direction, and which the third colored light beam modulated by the third light modulation device enters, and an emission surface located on an opposite side to the second plane of incidence, and adapted to emit the image obtained by combining the first colored light beam, the second colored light beam, and the third colored light beam entering the color combining device with each other in the first direction toward the projection optical device.

According to such a configuration, the colored light beams reflected by the first through third reflecting members and modulated by the corresponding light modulation devices enter the first through third planes of incidence of the color combining device from the three sides, respectively. Then, the image combined by the color combining device is emitted from the emission surface located on the opposite side to the second plane of incidence. According to such a configuration, in the image forming device, it is possible to form the area where the color separation device, the light modulation devices and the color combining device are disposed so as to have a rectangular shape. Therefore, it is possible to compactly arrange the constituents of the image forming device.

In the aspect of the invention described above, it is preferable that the illumination device includes a light source section adapted to emit a source light beam, a separating/combining section adapted to separate the source light beam into a first source light beam and a second source light beam, a wavelength conversion section adapted to emit a converted light beam obtained by wavelength-converting the first source light beam separated by the separating/combining section, a light diffusion section adapted to diffuse the second source light beam separated by the separating/combining section, and a radiation section connected to the light source section and adapted to radiate heat of the light source section, the light source section emits the source light beam in an opposite direction to the second direction, the separating/combining section emits the illumination light beam obtained by combining the converted light beam emitted from the wavelength conversion section and the second source light beam diffused by the light diffusion section with each other in an opposite direction to the first direction toward the light guide device, and the radiation section is located on the second direction side with respect to the light source section.

According to such a configuration, it is possible to make it easy to make the dimension of the illumination device in the second direction and the dimension of the image forming device in the same direction coincide with each other. Therefore, since it is possible to make it easy to make the dimensions of the first floor part and the second floor part coincide with each other, it is possible to miniaturize the projector.

In the aspect of the invention described above, it is preferable that there is further included a second source light beam reflecting member located on an opposite direction side to the second direction with respect to the separating/combining section, and adapted to reflect the second source light beam which has been separated by the separating/combining section and propagates in an opposite direction to the second direction toward the first direction, the wavelength conversion section and the light diffusion section are located on a same substrate located in the first direction with respect to the separating/combining section and the second source light beam reflecting member, and the separating/combining section emits, the first source light beam toward the first direction, the second source light beam toward an opposite direction to the second direction, the converted light beam entering the separating/combining section in an opposite direction to the first direction from the wavelength conversion section toward an opposite direction to the first direction, and the second source light beam entering the separating/combining section in the second direction from the light diffusion section via the second source light beam reflecting member toward an opposite direction to the first direction.

According to such a configuration, the wavelength conversion section and the light diffusion section are located on the same substrate.

According to the above, it is possible to reduce the dimension in the second direction compared to the case in which the wavelength conversion section is located on the first direction side with respect to the separating/combining section, and the light diffusion section is located on the first direction side with respect to the second source light beam reflecting member independently of the wavelength conversion section. Therefore, it is possible to miniaturize the illumination device. Further, thus, it is possible to make it easy to arrange the illumination device and the image forming device so as to overlap each other in the third direction.

In the aspect of the invention described above, it is preferable that the projector further includes a rotating device adapted to rotate the same substrate around a rotational axis parallel to the first direction.

The substrate provided with the wavelength conversion section and the light diffusion section is rotated by the rotating device described above. According to the above, since it is possible to change the incident position of the first source light beam in the wavelength conversion section, it is possible to prevent light saturation from occurring in the wavelength conversion section. Similarly, since it is possible to change the incident position of the second source light beam in the light diffusion section, it is possible to prevent a flicker from occurring.

Further, since the rotating device rotates the substrate described above, it is possible to simplify the configuration of the illumination device, and in addition, it is possible to further miniaturize the illumination device compared to the case in which the wavelength conversion section and the light diffusion section are disposed on respective substrates separate from each other, and the rotating device is provided to each of the substrates.

In the aspect of the invention described above, it is preferable that the wavelength conversion section is located in the first direction with respect to the separating/combining section, the light diffusion section is located in an opposite direction to the second direction with respect to the separating/combining section, and the separating/combining section emits the first source light beam toward the first direction, the second source light beam toward an opposite direction to the second direction, the converted light beam entering the separating/combining section in an opposite direction to the first direction from the wavelength conversion section toward an opposite direction to the first direction, and the second source light beam entering the separating/combining section in the second direction from the light diffusion section toward an opposite direction to the first direction.

According to such a configuration, since the wavelength conversion section and the light diffusion section are disposed so as to be separated from each other, it is possible to make it difficult to transfer the heat of one of the wavelength conversion section and the light diffusion section to the other. Therefore, the deterioration of the wavelength conversion section and the light diffusion section can be suppressed. Further, thus it is possible to adopt the light source section for emitting the high-intensity source light beam, and therefore, it is possible to configure the illumination device for emitting the high-intensity illumination light beam, and by extension, it is possible to configure the projector capable of projecting a high-intensity image.

In the aspect of the invention described above, it is preferable that the illumination device includes a first light source section adapted to emit a blue light beam in an opposite direction to the first direction, a second light source section adapted to emit an excitation light beam in the opposite direction to the first direction, a light diffusion section located in the opposite direction to the first direction with respect to the first light source section, and adapted to diffuse the blue light beam entering the light diffusion section, a reflecting section located in the opposite direction to the first direction with respect to the second light source section, and adapted to reflect the excitation light beam entering the reflecting section toward an opposite direction to the second direction, a light combining section located in the opposite direction to the first direction with respect to the light diffusion section, and adapted to emit the excitation light beam entering the light combining section via the reflecting section toward the opposite direction to the second direction, a wavelength conversion section located in the opposite direction to the second direction with respect to the light combining section, and adapted to emit a converted light beam obtained by wavelength-converting the excitation light beam entering the wavelength conversion section from the light combining section, and a radiation section located in the first direction with respect to the first light source section and the second light source section, and adapted to radiate heat transferred from the first light source section and the second light source section, and the light combining section emits the blue light beam entering the light combining section from the light diffusion section and the converted light beam entering the light combining section from the wavelength conversion section toward the opposite direction to the first direction.

According to such a configuration, since the constituents described above can densely be arranged, it is possible to miniaturize the illumination device. In addition, since the first light source section for emitting the blue light beam and the second light source section for emitting the excitation light beam to be converted into the converted light beam are separated from each other, by adjusting the light intensity of the blue light beam emitted from the first light source section and the light intensity of the excitation light beam emitted from the second light source section, it is possible to easily adjust the white balance of the illumination light beam emitted form the illumination device. Further, since there is no need to separate the blue light beam and the excitation light beam from each other using the polarized light, it is possible to adopt the dichroic mirror as the light combining section. Therefore, it is possible to provide a simple configuration to the light combining section, and further, it is possible to prevent the deterioration of the light utilization efficiency due to depolarization in the optical element such as the light diffusion section and the lens from occurring.

In the aspect of the invention described above, it is preferable that the light guide device includes a reflecting member adapted to reflect the illumination light beam entering the light guide device from the illumination device toward the image forming device.

According to such a configuration, it is possible to adopt a simple configuration to the light guide device. Therefore, it is possible to simplify the configuration of the light guide device, and by extension, it is possible to simplify the configuration of the projector.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
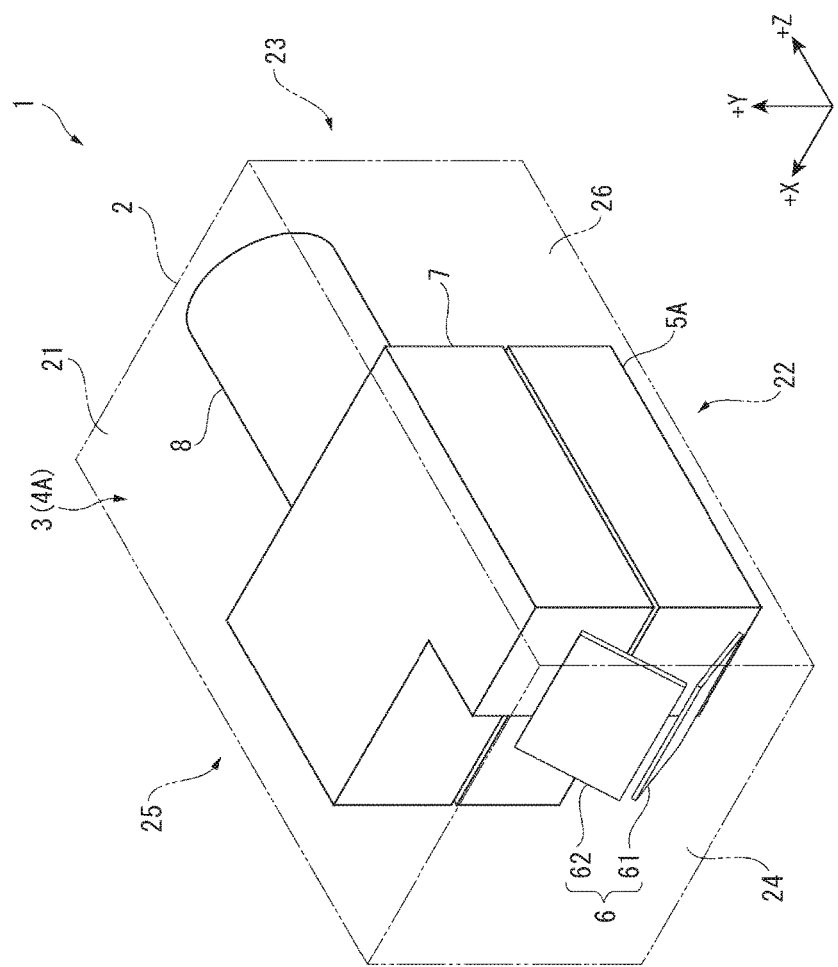
FIG. 1 is a perspective view schematically showing a projector according to a first embodiment of the invention.

A first embodiment of the invention will hereinafter be described based on the accompanying drawings.
Schematic Configuration of Projector FIG. 1 is a perspective view schematically showing the projector 1 according to the present embodiment.

The projector 1 according to the present embodiment is an image display device for forming an image corresponding to image information, and then projecting the image on a projection target surface such as a screen or a wall in an enlarged manner to thereby display the image. As shown in FIG. 1, the projector 1 is provided with an exterior housing 2 forming an exterior, and a device main body 3 housed in the exterior housing 2.

Further, although described later in detail, one of the features of the projector 1 is the layout of an illumination device 5A, a light guide device 6, an image forming device 7 and a projection optical device 8 of an image projection device 4A constituting the device main body 3.

Hereinafter, each of the constituents of the projector 1 will be described in detail.
Configuration of Exterior Housing The exterior housing 2 is a housing formed to have a roughly rectangular solid shape, and covering the device main body 3. The exterior housing 2 has a top surface part 21, a bottom surface part 22, a front surface part 23, aback surface part 24, a right side surface part 25, and a left side surface part 26. Among these parts, the top surface part 21 and the bottom surface part 22, the front surface part 23 and the back surface part 24, and the right side surface part 25 and the left side surface side 26 are each side surface parts located on the respective sides opposite to each other.

Among these parts, the front surface part 23 has an opening part through which the image projected by the projection optical device 8 described above passes although not shown in the drawings.

In the following description, among a +Z direction, a +X direction and a +Y direction perpendicular to each other, the +Z direction (a first direction) is defined as a direction from the back surface part 24 toward the front surface part 23. Further, the +X direction (a second direction) is defined as a direction from the left side surface part 26 toward the right side surface part 25, and the +Y direction (a third direction) is defined as a direction from the bottom surface part 22 toward the top surface part 21. Further, although not shown in the drawings, an opposite direction to the +Z direction is defined as a −Z direction. The same applies to a −Y direction and a −X direction. It should be noted that in the following description, the +Z direction, the +X direction and the +Y direction are defined as directions (perpendicular directions) perpendicular to each other.

Therefore, in the case of being viewed from the +Y direction (the third direction) side, the +Z direction (the first direction) coincides with the projection direction of the image by the projector 1.

Configuration of Device Main Body

The device main body 3 is provided with the image projection device 4A. Besides the above, although not shown in the drawings, the device main body 3 is provided with a control device for controlling operations of the projector 1, a cooling device for cooling a cooling target constituting the projector 1, and a power supply device for supplying electrical power to electronic components constituting the projector 1.

Configuration of Image Projection Device

Figure 2:
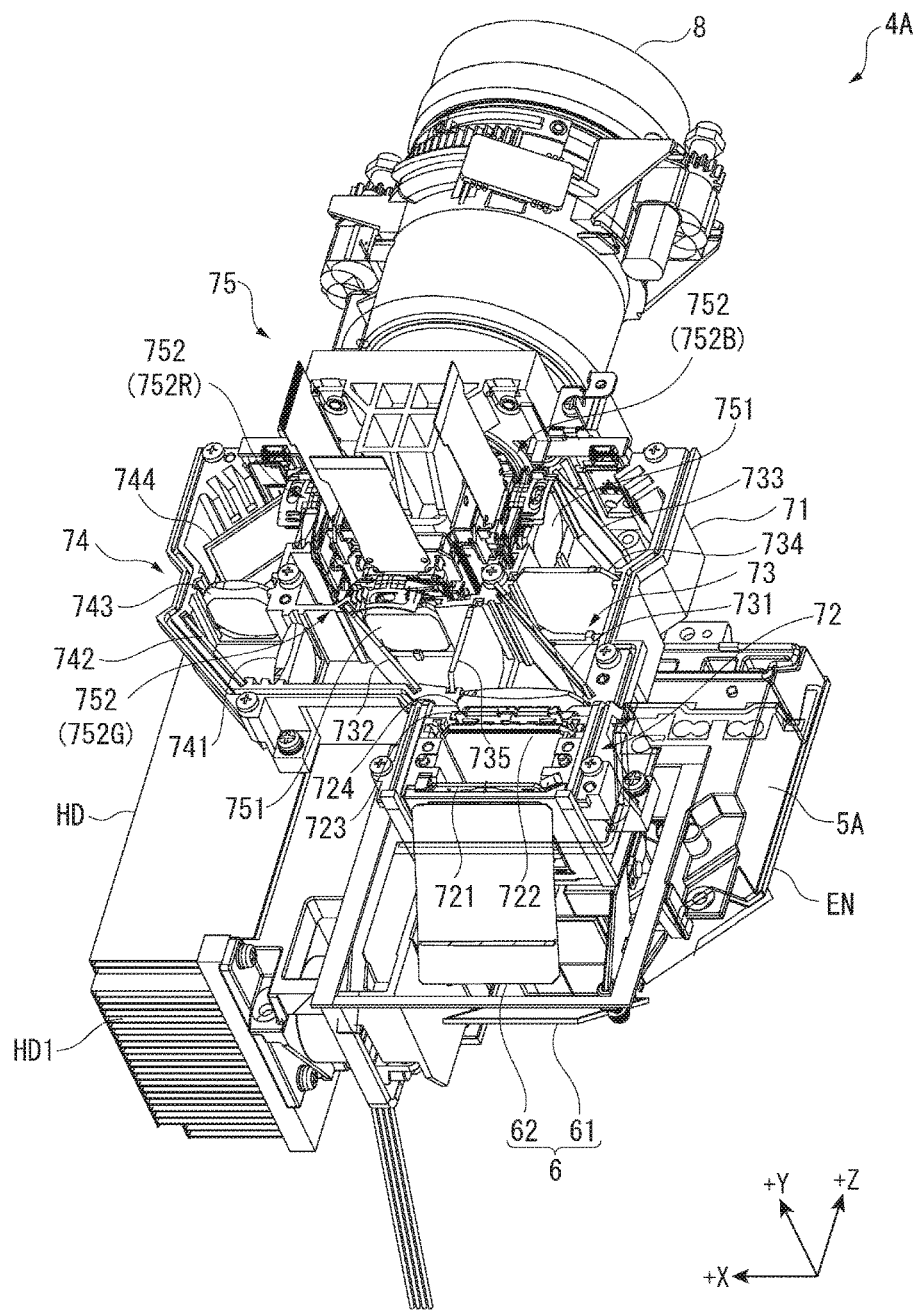
FIG. 2 is a perspective view showing an image projection device in the first embodiment.
Figure 3:
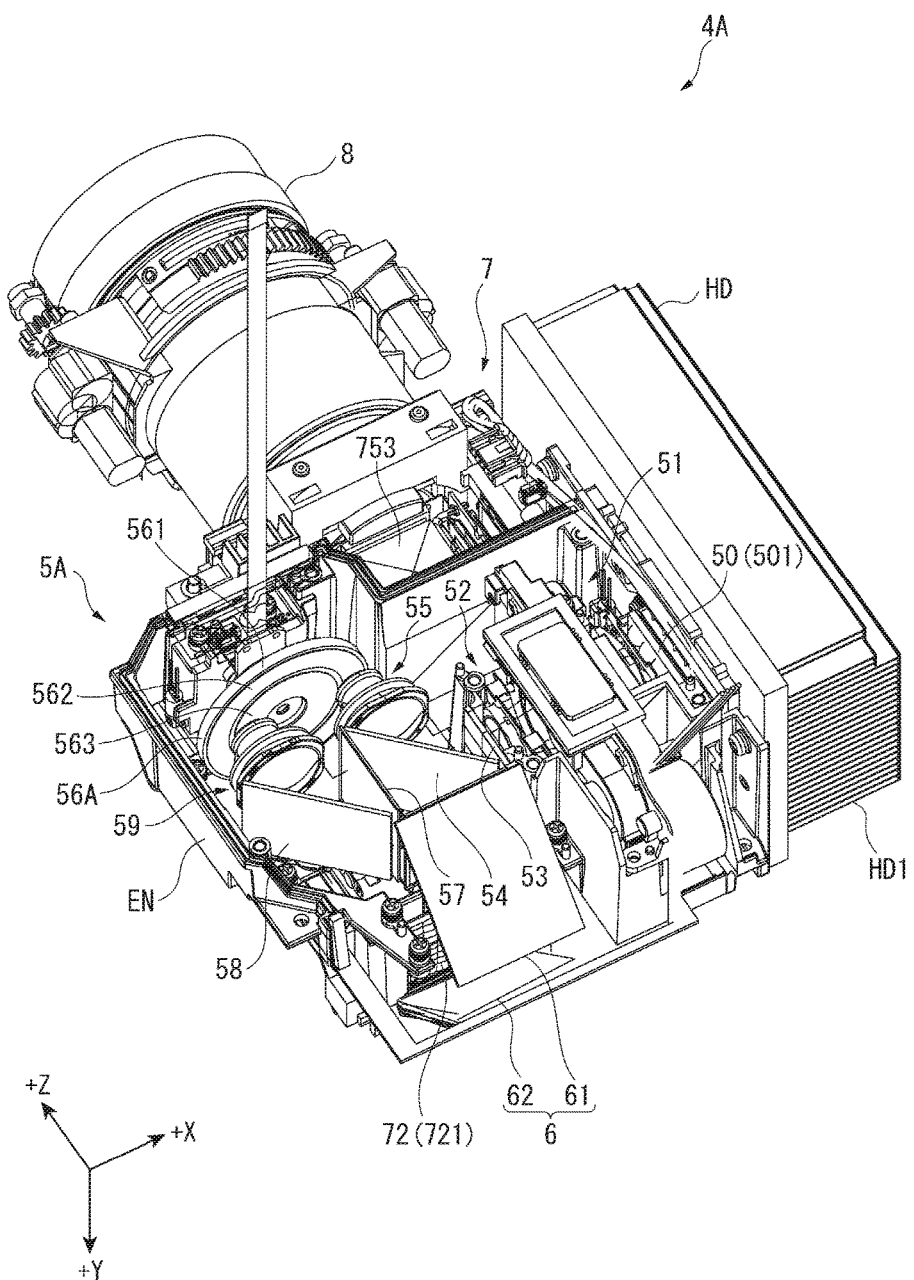
FIG. 3 is a perspective view showing the image projection device in the first embodiment.

FIG. 2 and FIG. 3 are perspective views of the image projection device 4A viewed from the +Y direction side and the −Y direction side, respectively. Further, FIG. 4 through FIG. 9 are diagrams of the image projection device 4A viewed from the +Y direction side, the −Y direction side, the +X direction side, −X direction side, the +Z direction side, and the −Z direction side, respectively. In other words, FIG. 4 through FIG. 9 are a plan view (a top view), a bottom view, a right side view, a left side view, a front view and a back view, respectively, showing the image projection device 4A. It should be noted that in FIG. 8 and FIG. 9, an outline of a housing EN of the illumination device 5A and an outline of the image forming device 7 are supplementarily indicated by dashed-two dotted lines.

The image projection device 4A projects image light based on the image information (including an image signal) input from the control device on the projection target surface described above to display an image corresponding to the image light. As shown in FIG. 2 through FIG. 9, the image projection device 4A is provided with the illumination device 5A, the light guide device 6, the image forming device 7, and the projection optical device 8. In the image projection device 4A, the light guide device 6 guides the illumination light emitted from the illumination device 5A to the image forming device 7 located on the +Y direction side with respect to the illumination device 5A, and then the projection optical device 8 projects the image formed by the image forming device 7.

Configuration of Illumination Device

Figure 5:
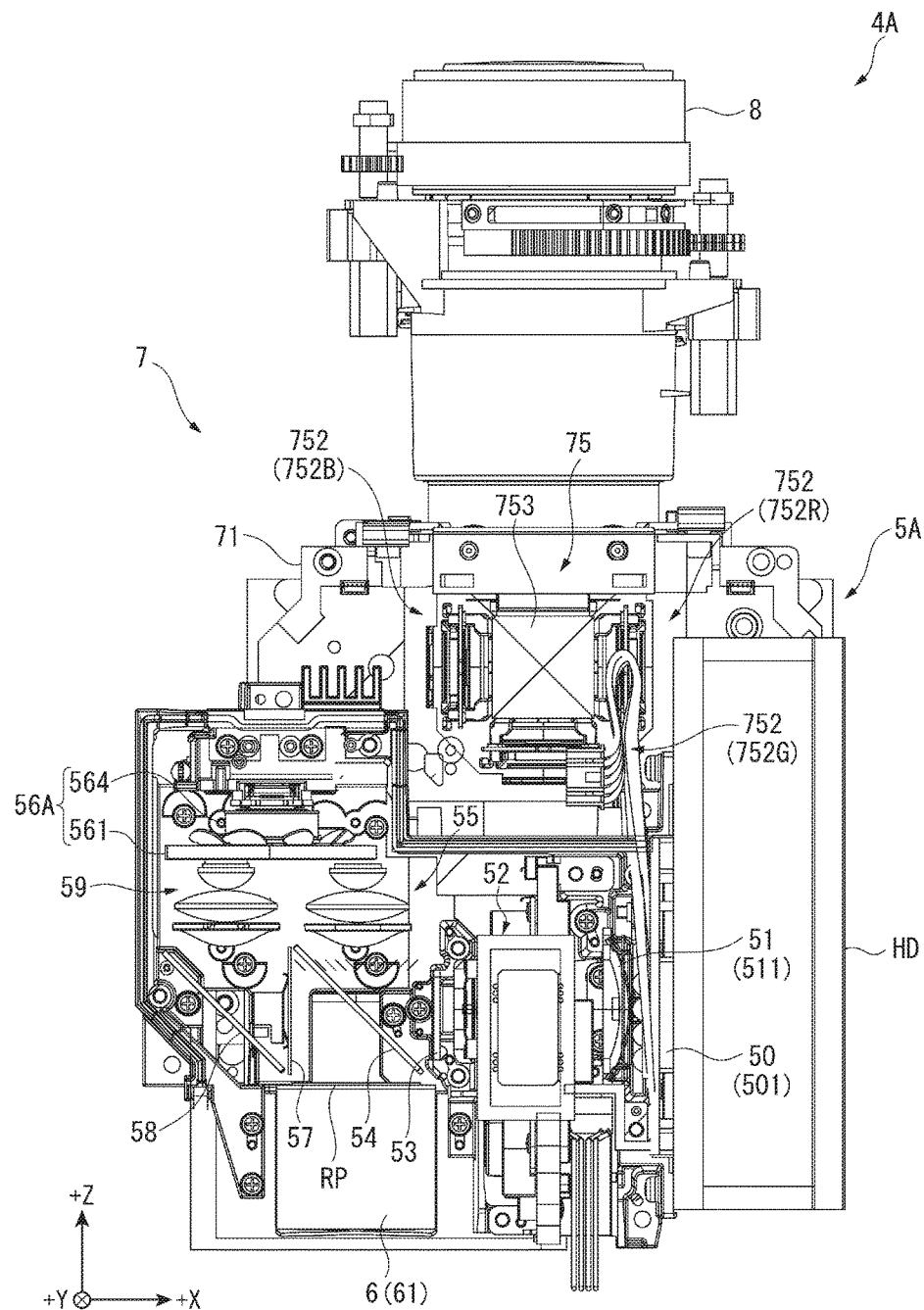
FIG. 5 is a bottom view showing the image projection device in the first embodiment.
Figure 6:
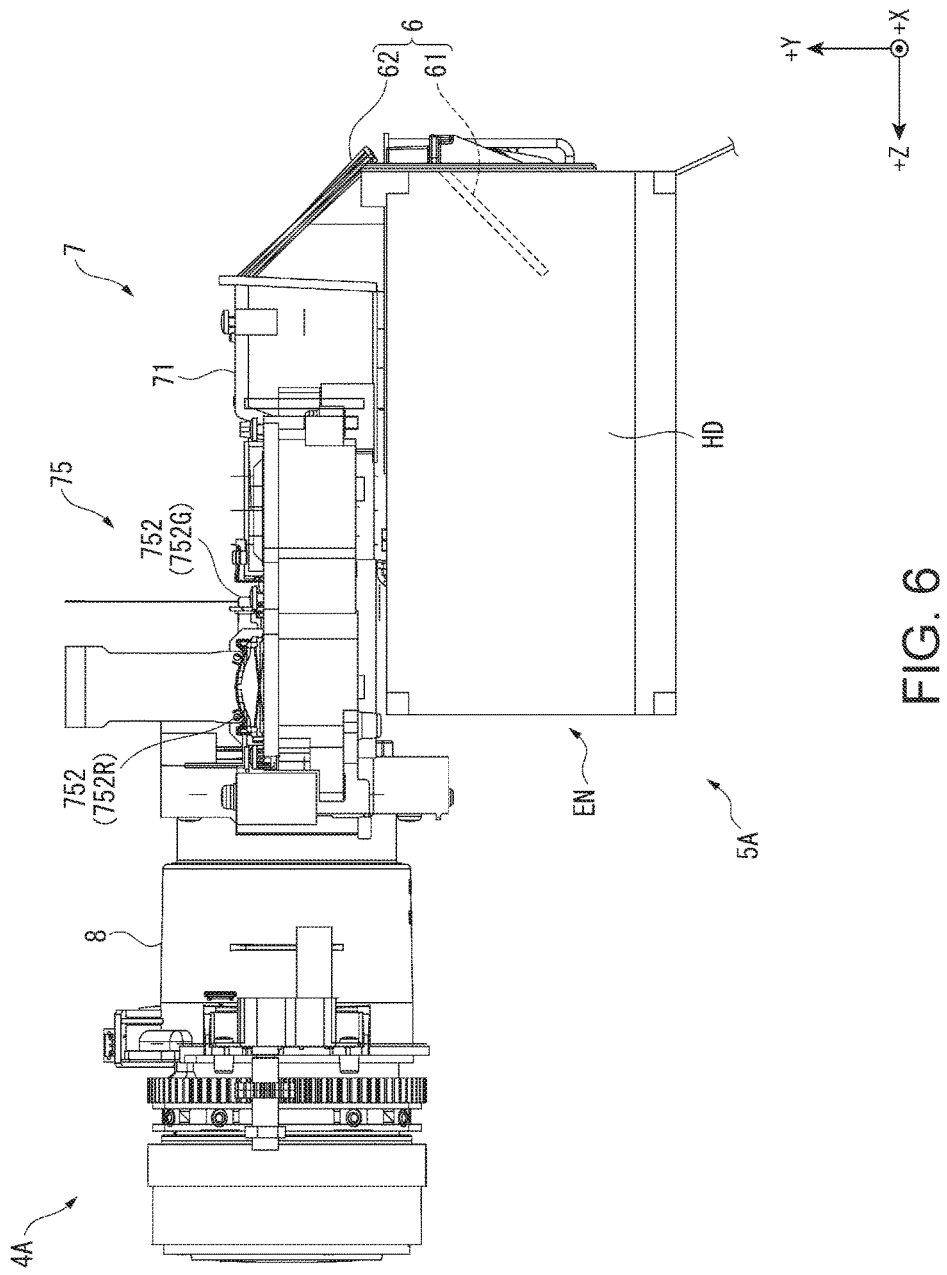
FIG. 6 is a right side view showing the image projection device in the first embodiment.
Figure 7:
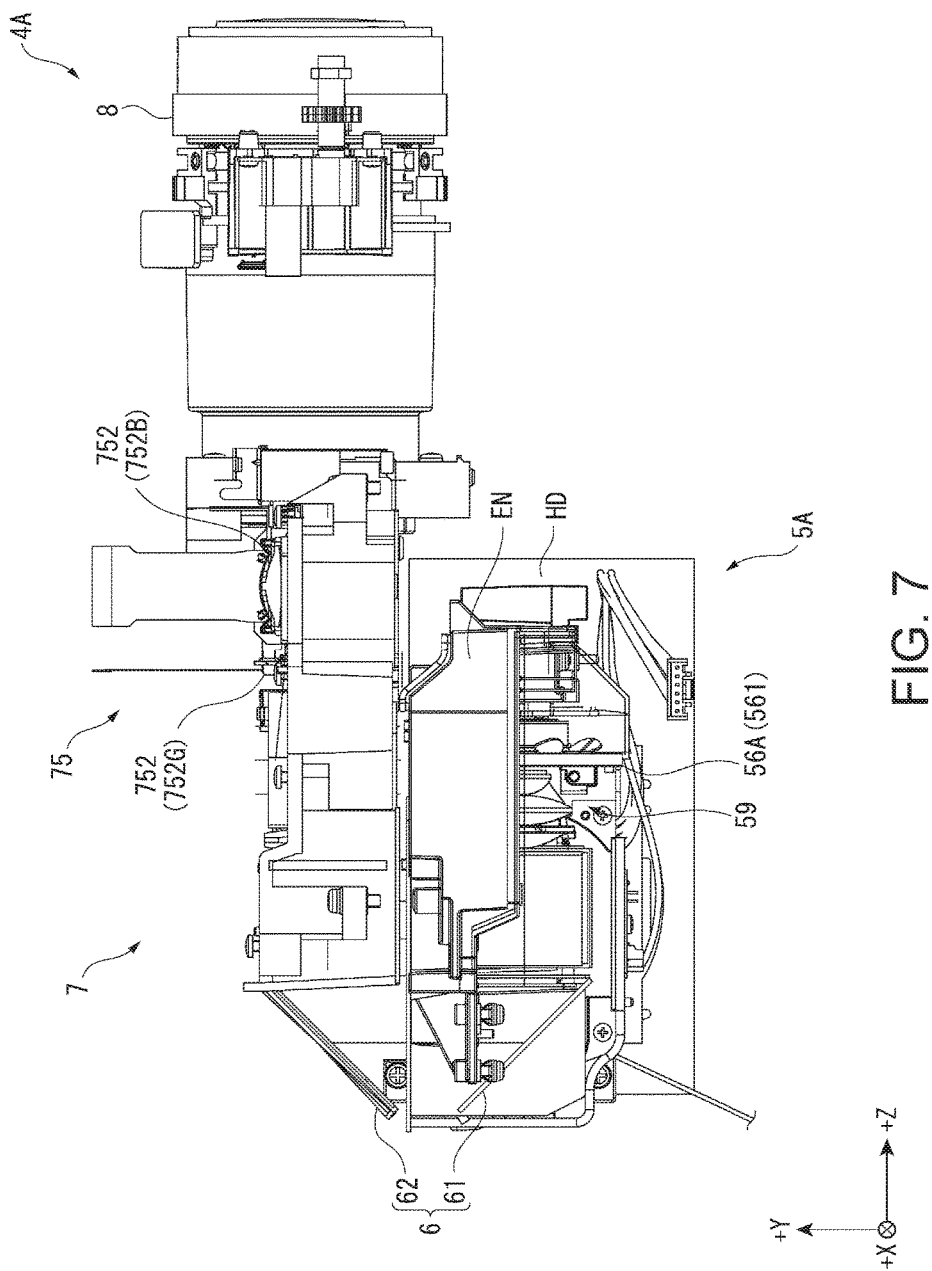
FIG. 7 is a left side view showing the image projection device in the first embodiment.
Figure 10:
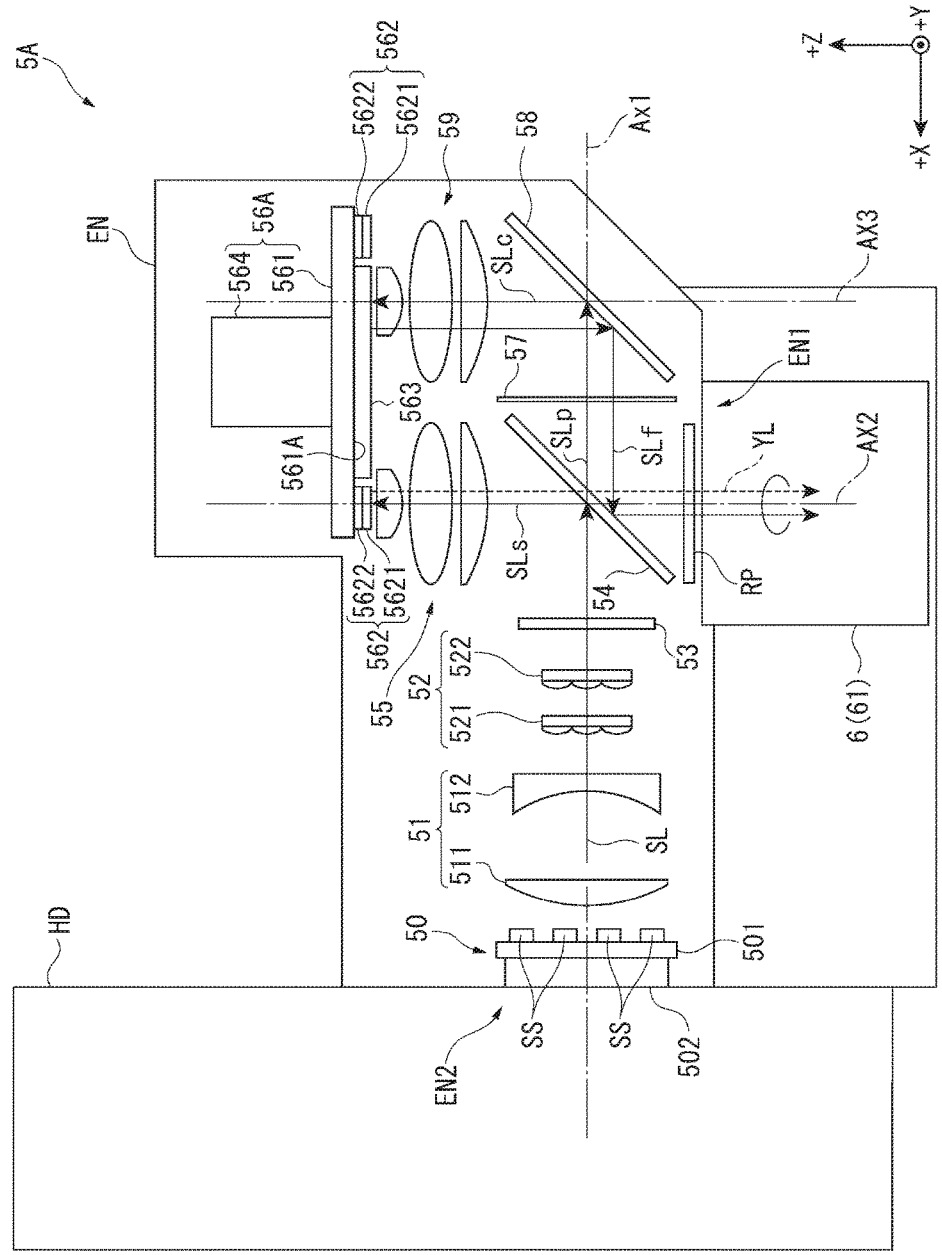
FIG. 10 is a schematic diagram showing a configuration of an illumination device in the first embodiment.

FIG. 10 is a schematic diagram showing a configuration of the illumination device 5A viewed from the +Y direction side. It should be noted that since FIG. 10 is a diagram of the configuration of the illumination device 5A viewed from the +Y direction side, the +X direction in FIG. 3 and FIG. 5 is opposite to the +X direction in FIG. 10.

The illumination device 5A emits the illumination light toward the −Z direction side to the light guide device located on the −Z direction side with respect to the illumination device 5A. As shown in FIG. 10, the illumination device 5A is provided with a light source section 50, an afocal optical element 51, a homogenizer optical element 52, a first retardation element 53, a separating/combining element 54, a first light collection element 55, a wavelength conversion device 56A, a second retardation element 57, a reflecting member 58, a second light collection element 59, and a retardation element RP, the housing EN for housing these constituents inside, and a radiation member HD.

Among these constituents, the light source section 50, the afocal optical element 51, the homogenizer optical element 52, the first retardation element 53, the separating/combining element 54, the second retardation element 57 and the reflecting member 58 are arranged on the illumination optical axis Ax1 parallel to the +X direction in this order in the +X direction. Further, a part of the wavelength conversion device 56A, the first light collection element 55, the separating/combining element 54 and the retardation element RP are arranged on an illumination optical axis Ax2 crossing the illumination optical axis Ax1 and parallel to the +Z direction in this order from the +Z direction side. Further, a part of the wavelength conversion device 56A, the second light collection element 59, and the reflecting member 58 are arranged on an illumination optical axis Ax3 crossing the illumination optical axis Ax1 and parallel to the illumination optical axis Ax2 in this order from the +Z direction side. As described above, the separating/combining element 54 is located in a crossing region of the illumination optical axes Ax1, Ax2, and the reflecting member 58 is located in a crossing region of the illumination optical axes Ax1, Ax3. It should be noted that the illumination optical axes Ax2, Ax3 are not required to be completely parallel to each other. Further, the illumination optical axis Ax1 is not required to be perpendicular to each of the illumination optical axes Ax2, Ax3, but is only required to cross these illumination optical axes Ax2, Ax3.

Configuration of Light Source Section

The light source section 50 emits source light SL as blue light toward the −X direction. The light source section 50 is provided with an array light source 501 having a plurality of solid-state light sources SS arranged in a matrix, and a collimator optical element (not shown).

Each of the solid-state light sources SS emits, for example, a laser beam having a peak wavelength of 460 nm as the source light SL. It should be noted that in the present embodiment, each of the solid-state light sources SS emits the laser beam as s-polarized light. The array light source 501 in which such solid-state light sources SS are disposed is a cooling object, and is therefore connected to the radiation member HD disposed on the +X direction side.

The collimator optical element converts the source light SL emitted from the solid-state light sources SS into parallel light.

Configuration of Afocal Optical Element and Homogenizer Optical Element

The afocal optical element 51 has a lens 511 for reducing in diameter of the source light SL entering the lens 511 from the light source section 50, and a lens 512 for collimating the source light SL entering the lens 512 from the lens 511.

The homogenizer optical element 52 converts the illuminance distribution of the source light SL into a homogenized state in an illumination target area. The homogenizer optical system 52 is provided with a pair of multi-lens arrays 521, 522. It should be noted that the illumination target area corresponds to the wavelength conversion device 56A (a wavelength conversion section 562) described later.

Configuration of First Retardation Element

The first retardation element 53 is a half-wave plate. Bypassing through the first retardation element 53, the source light SL as the s-polarized light entering the first retardation element 53 from the homogenizer optical element is partially converted into p-polarizer light, and is emitted as the source light SL having first source light SLs as the s-polarized light and second source light SLp as the p-polarized light mixed with each other.

Configuration of Separating/Combining Element

The separating/combining element 54 corresponds to a separating/combining section, and is disposed so as to be tilted 45° with respect to the illumination optical axes Ax1, Ax2. The separating/combining element 54 has characteristics of transmitting fluorescence YL entering the separating/combining element 54 from the first light collection element 55 described later irrespective of the polarization state of the fluorescence YL in addition to separating the first source light SLs and the second source light SLp included in the source light SL entering the separating/combining element 54 from the first retardation element 53 from each other. In other words, the separating/combining element 54 has wavelength-selective polarization separation characteristics of separating the s-polarized light and the p-polarized light from each other with respect to light in a predetermined wavelength band while transmitting both of the s-polarized light and the p-polarized light with respect to light in another predetermined wavelength band.

Due to such a separating/combining element 54, the second source light SLp out of the source light SL entering the separating/combining element 54 from the first retardation element 53 is transmitted along the illumination optical axis Ax1 toward the −X direction side, and the first source light SLs is reflected along the illumination optical axis Ax2 toward the +Z direction side.

Configuration of First Light Collection Element

The first light collection element 55 converges the first source light SLs entering the first light collection element 55 from the separating/combining element 54 on the wavelength conversion device 56A, and in addition, converges the fluorescence YL emitted from the wavelength conversion device 56A to enter the separating/combining element 54. Such a first light collection element 55 is configured as a pickup lens group having three lenses. However, the first light collection element 55 is not limited to this configuration, but can also have a configuration having a single lens, or three lenses or more.

It should be noted that the configuration of the wavelength conversion device 56A will be described later in detail.

Configuration of Second Retardation Element and Reflecting Member

The second retardation element 57 is a quarter-wave plate. The second retardation element 57 converts the second source light SLp as the p-polarized light entering the second retardation element 57 into second source light SLc as circularly-polarized light.

The reflecting member 58 corresponds to a second source light reflecting member, reflects the second source light SLc having passed through the second retardation element 57 toward the +Z direction side to enter the second light collection element 59 located on the illumination optical axis Ax3. Further, the reflecting member 58 reflects the second source light SLc entering the reflecting member 58 from the second light collection element 59 toward the +X direction side to enter the second retardation element 57. The reflecting member 58 is a mirror shaped like a flat plate.

Configuration of Second Light Collection Element

The second light collection element 59 converges the second source light SLc entering the second light collection element 59 from the reflecting member 58 on a light diffusion section 563 of the wavelength conversion device 56A, and in addition, converges the second source light SLc entering the second light collection element 59 from the wavelength conversion device 56A to enter the reflecting member 58 once again. Such a second light collection element 59 is configured as a pickup lens group having three lenses similarly to the first light collection element 55, but the number of the lenses constituting the second light collection element 59 can arbitrarily be changed.

It should be noted that since the second source light SLc is reflected by the reflecting member 58 and the wavelength conversion device 56A, the polarization direction of the circularly-polarized light of the second source light SLc when entering the reflecting member 58 from the second retardation element 57 and the polarization direction of the circularly-polarized light of the second source light SLc when entering the second retardation element 57 from the reflecting member 58 become opposite to each other. Therefore, in the process of passing through the second retardation element 57 once again described above, the second source light SLc is converted into second source light SLf as s-polarized light having the polarization direction rotated 90° with respect to the p-polarized light, and is then made to enter the separating/combining element 54.

Configuration of Wavelength Conversion Device

The wavelength conversion device 56A has a function as a wavelength conversion device for converting the wavelength of the first source light SLs to emit the fluorescence YL, and in addition, has a function as a diffusely reflecting device for diffusely reflecting the second source light SLc described above. In other words, the wavelength conversion device 56A is a reflective-type wavelength conversion device and at the same time a reflective-type diffusion device for emitting a fluorescence and diffused light toward the incident side of the source light, respectively. The wavelength conversion device 56A is located on the +Z direction side with respect to the separating/combining element 54 described above, the reflecting member 58 and the light collection elements 55, 59.

Such a wavelength conversion device 56A is provided with a substrate 561 shaped like a circular disk as a wavelength conversion element, and a rotating device 564 for rotating the substrate 561 around a rotational axis parallel to the illumination optical axes Ax2, Ax3.

The substrate 561 has a wavelength conversion section 562 shaped like a circular ring located on an outer circumferential side of a plane of incidence of light 561A, and the light diffusion section 563 shaped like a circular ring located on an inner circumferential side. The wavelength conversion section 562 and the light diffusion section 563 are disposed concentrically with a predetermined distance centered on the rotational axis of the substrate 561. In other words, the wavelength conversion section 562 and the light diffusion section 563 are located on the same substrate 561.

The wavelength conversion section 562 has a wavelength conversion layer 5621 and a reflecting layer 5622.

The wavelength conversion layer 5621 includes a phosphor for converting the wavelength of the incident light, and converts the first source light SLs described above into the yellow fluorescence YL (converted light) to diffusely emit the fluorescence YL.

The reflecting layer 5622 is located between the wavelength conversion layer 5621 and the plane of incidence of light 561A, and reflects the fluorescence YL, which propagates toward the reflecting layer 5622, toward the wavelength conversion layer 5621.

The light diffusion section 563 diffusely reflects (makes Lambert reflection on) the second source light SLc entering the light diffusion section 563 from the second light collection element 59.

It should be noted that a part of the wavelength conversion section 562 shaped like a circular ring is located on the illumination optical axis Ax2 described above, and the first source light SLs described above enters the part. Further, a part of the light diffusion section 563 shaped like a circular ring is located on the illumination optical axis Ax3 described above, and the second source light SLc enters the part. The incident positions of the first source light SLs and the second source light SLc are changed to other positions in the wavelength conversion section 562 and the light diffusion section 563, respectively, when the substrate 561 is rotated. Thus, the first source light SLs and the second source light SLc are prevented from always entering the same positions.

Then, the fluorescence YL having been diffusely emitted from the wavelength conversion section 562 enters the separating/combining element 54 from the +Z direction side via the first light collection element 55. Further, the second source light SLc having been diffusely reflected is converted into the second source light SLf as the s-polarized light via the second light collection element 59, the reflecting member 58 and the second retardation element 57, and then enters the separating/combining element 54 from the −X direction side as described above.

Among these, the fluorescence YL passes through the separating/combining element 54 in the −Z direction, and then propagates along the illumination optical axis Ax2 toward the −Z direction side due to the characteristics of the separating/combining element 54. The fluorescence constitutes a green light component and a red light component included in the illumination light emitted from the illumination device 5A.

Meanwhile, the second source light SLf is reflected by the separating/combining element 54 along the illumination optical axis Ax2 toward the −Z direction side also due to the characteristics of the separating/combining element 54. The second source light SLf constitutes a blue light component included in the illumination light.

Configuration of Retardation Element

The retardation element RP converts the fluorescence YL and the second source light SLf as the blue light each entering the retardation element RP from the separating/combining element 54 into circularly-polarized light having the s-polarized light and the p-polarized light mixed with each other. The reason that such a retardation element RP is disposed is as follows. Since the fluorescence YL is non-polarized light while the second source light SLf is the s-polarized light, it is necessary to prevent the blue light from being emitted from a light emission surface of a polarization conversion element 723 described later in a striped manner and from causing color shading in the image to be projected.

Configuration of Housing and Radiation Member

The housing EN is a box-like housing for housing the constituents 50 through 59 described above inside. The housing EN has opening parts EN1, EN2. Among these, the opening part EN1 is an opening part through which the illumination light described above emitted from the retardation element RP described above passes. Further, the opening part EN2 is an opening part for exposing an end surface 502 on the +X direction side in the light source section 50 (the array light source 501) on the +X direction side, and the radiation member HD has contact with the end surface 502 in a heat transmissive manner.

Figure 8:
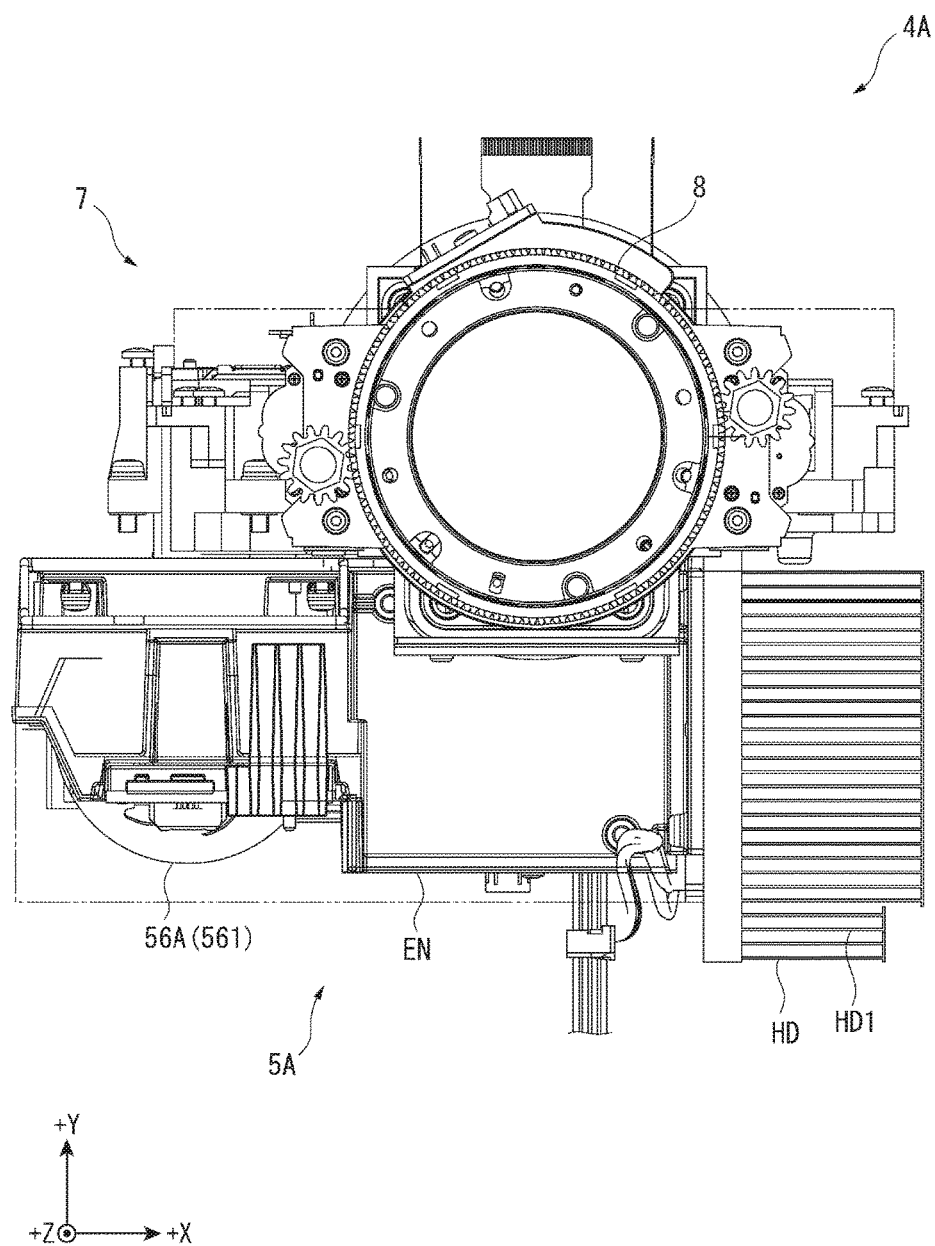
FIG. 8 is a front view showing the image projection device in the first embodiment.

The radiation member HD is a radiation section located on the +X direction side with respect to the light source section 50. As shown in FIG. 3 and FIG. 8, such a radiation member HD has a configuration in which a plurality of fins HD1 extending along the X-Z plane is arranged in the +Y direction.

Configuration of Light Guide Device

As described above, the light guide device 6 has a function of guiding the illumination light entering the light guide device 6 from the illumination device 5A to the image forming device 7. As shown in FIG. 2 through FIG. 7, and FIG. 9, the light guide device 6 is configured including two reflecting members 61, 62 each formed of a mirror.

Out of the two reflecting members 61, 62, the reflecting member 61 located on the −Y direction side is located on the −Z direction side with respect to the illumination device 5A (the separating/combining element 54) described above, and the illumination light described above emitted toward the −Z direction side from the separating/combining element 54 enters the reflecting member 61 via the retardation element RP. The reflecting member 61 reflects the illumination light toward the +Y direction side to enter the reflecting member 62.

The reflecting member 62 is located on the −Z direction side with respect to a homogenizing device 72 (a first lens array 721) in the image forming device 7, and on the +Y direction side with respect to the reflecting member 61. The reflecting member 62 reflects the illumination light entering the reflecting member 62 from the reflecting member 61 toward the +Z direction side to make the illumination light enter the homogenizing device 72.

It should be noted that the light guide device 6 is provided with the configuration having the reflecting members 61, 62 described above in the present embodiment, but is not limited to this configuration, and it is also possible to use a prism.

Configuration of Image Forming Device

Figure 11:
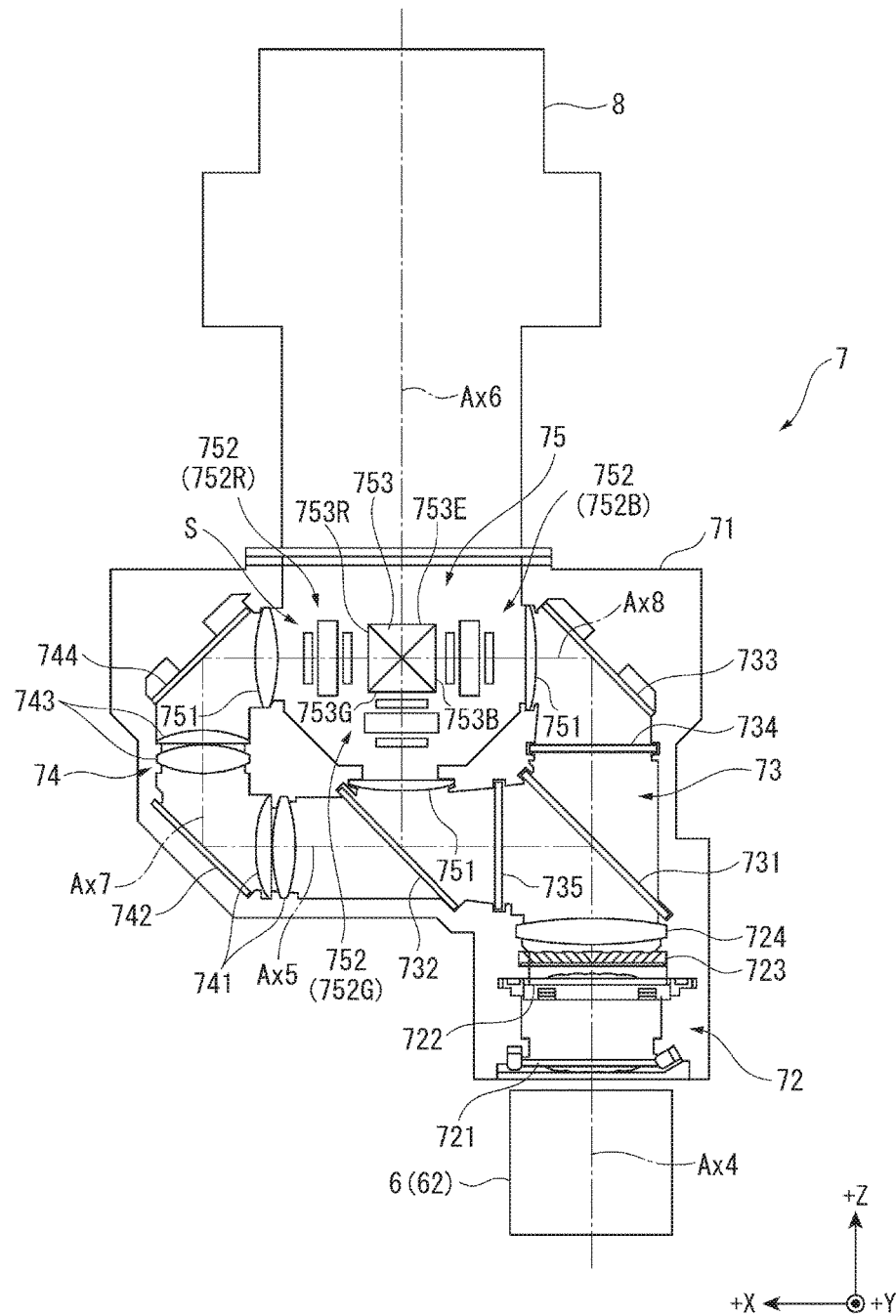
FIG. 11 is a schematic diagram showing a configuration of an image forming device in the first embodiment.

FIG. 11 is a schematic diagram showing a configuration of the image forming device 7.

Figure 4:
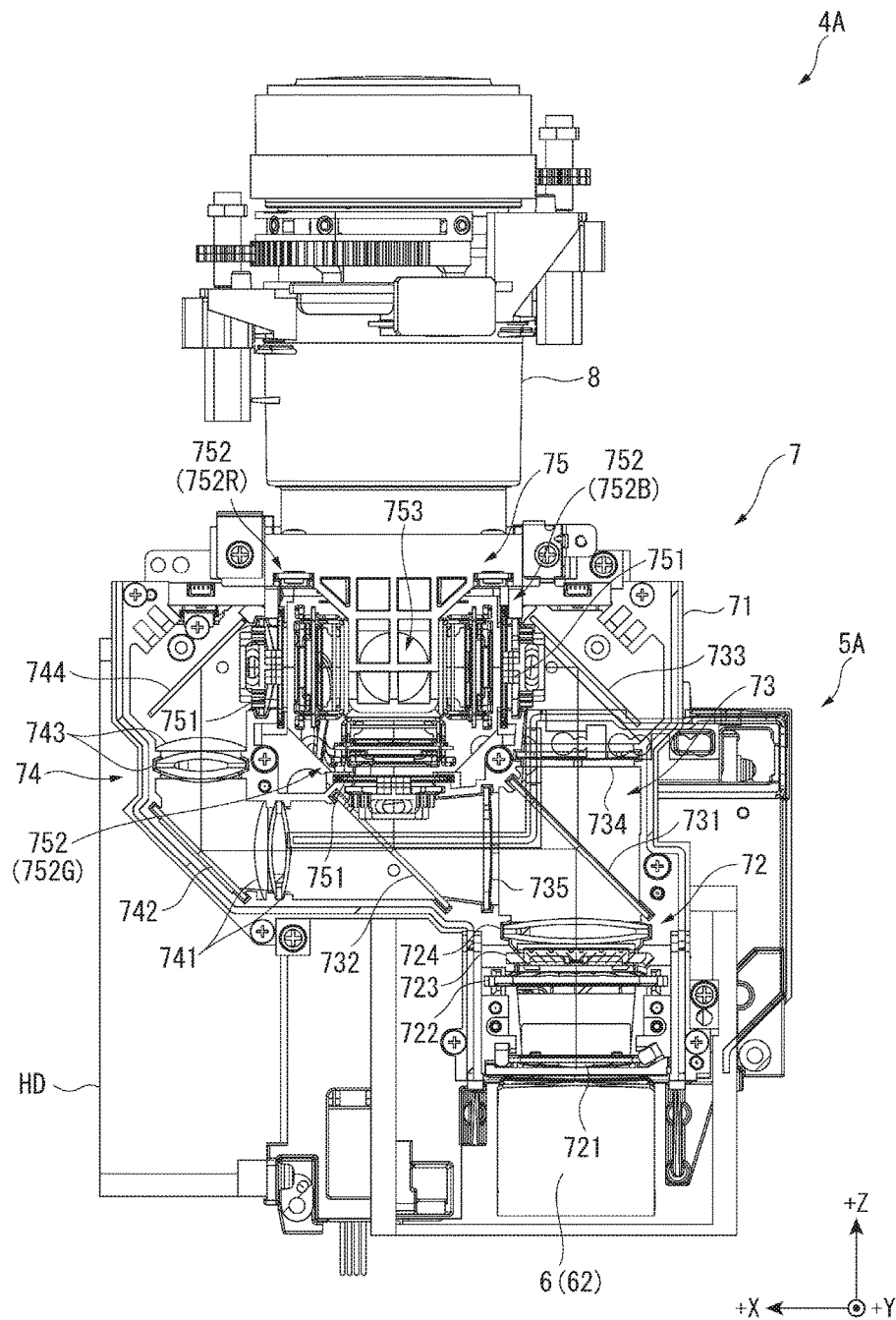
FIG. 4 is a plan view showing the image projection device in the first embodiment.

As described above, the image forming device 7 is for modulating the illumination light entering the image formation device 7 in accordance with the image information to form an image corresponding to the image information, and constitutes an image projection unit together with the projection optical device 8 described later. As shown in FIG. 2, FIG. 4 and FIG. 11, the image forming device 7 is provided with an optical component housing 71, the homogenizing device 72, a color separation device 73, a relay device 74 and an electro-optic device 75.

The configuration of the image forming device 7 will hereinafter be described based on FIG. 11.

Configuration of Optical Component Housing

The optical component housing 71 holds the devices through 74 described above, and field lenses 751 constituting the electro-optic device 75.

Here, similarly to the illumination device 5A, illumination optical axes Ax4 through Ax8 as optical axes in design are set in the image forming device 7, and the optical component housing 71 holds the devices 72 through 74 described above and the field lenses 751 at predetermined positions on these illumination optical axes Ax4 through Ax8. Further, the optical component housing 71 has a space S in which the electro-optic device 75 except the field lenses 751 is disposed at a position enclosed by the field lenses 751 on three sides.

It should be noted that out of the illumination optical axes Ax4 through Ax8, the illumination optical axis Ax4 extends from the reflecting member 62 of the light guide device 6 along the +Z direction, and is set at a position overlapping the illumination optical axis Ax2 described above viewed from the +Y direction side. The illumination optical axis Ax5 crosses the illumination optical axis Ax4, and extends along the +X direction. Further, the illumination optical axes Ax6, Ax7 each cross the illumination optical axis Ax5, extend along the +Z direction, and the illumination optical axis Ax7 is set on the +X direction side with respect to the illumination optical axis Ax6. Further, the illumination optical axis Ax8 crosses the illumination optical axes Ax4, Ax6, and Ax7, and extends along the +X direction. It should be noted that the illumination optical axes Ax4, Ax6, and Ax7 are not required to be completely parallel to each other, and the illumination optical axes Ax5, Ax8 are not required to be completely parallel to each other. Further, the illumination optical axes Ax4, Ax6, and Ax7 are not required to be perpendicular to each of the illumination optical axes Ax5, Ax8, but are only required to cross these illumination optical axes Ax5, Ax8.

Configuration of Homogenizing Device

The homogenizing device 72 homogenizes the illuminance distribution of the light beam entering the homogenizing device 72 from the light guide device 6. The homogenizing device 72 is provided with the first lens array 721, a second lens array 722, a polarization conversion element 723, and a superimposing lens 724 disposed on the illumination optical axis Ax4 in this order from the −Z direction side. It should be noted that the homogenizing device 72 can further be provided with a dimming device for blocking a part of the transmitted light beam to control the intensity of the transmitted light.

Among these, the polarization conversion element 723 has a plurality of polarization separation layers, a plurality of reflecting layers, and a plurality of retardation layers.

The plurality of polarization separation layers and the plurality of reflecting layers are formed to be elongated in the +Y direction, and are alternately arranged in the +X direction. It should be noted that the polarization separation layers are disposed at positions where the partial light beams emitted from the second lens array 722 respectively enter, and the reflecting layers are disposed at positions where the partial light beams do not directly enter.

The polarization separation layers each transmit the p-polarized light and each reflect the s-polarized light. The reflecting layers disposed corresponding respectively to the polarization separation layers each reflect the s-polarized light reflected by the corresponding polarization separation layer so as to propagate along the passing direction of the p-polarized light. Then, each of the retardation layers is disposed on the light paths of the p-polarized light having passed through the polarization separation layer, and converts the p-polarized light entering the retardation layer into the s-polarized light. Thus, the light beams emitted from the polarization conversion element 723 are uniformed in polarization direction to be s-polarized light, and the s-polarized light is emitted from roughly entire area in the light emission surface of the polarization conversion element 723. It should be noted that the polarization conversion element 723 can also be provided with a configuration of emitting the p-polarized light.

Configuration of Color Separation Device

The color separation device 73 separates the colored light beams of red, green, and blue from the light beam entering the color separation device 73 from the homogenizing device 72. The color separation device 73 is provided with dichroic mirrors 731, 732, a reflecting mirror 733, and lenses 734, 735.

The dichroic mirror 731 corresponds to a first color separation element, and is located at a crossing region between the illumination optical axes Ax4, Ax5. Among the light beams entering the dichroic mirror 731, the dichroic mirror 731 transmits the blue light beam toward the +Z direction parallel to the illumination optical axis Ax4, and reflects the green light beam and the red light beam toward the +X direction parallel to the illumination optical axis Ax5.

The dichroic mirror 732 corresponds to a second color separation element, and is located at a crossing region between the illumination optical axes Ax5, Ax6. Among the green light beam and the red light beam thus separated, the dichroic mirror 732 reflects the green light beam toward the +Z direction parallel to the illumination optical axis Ax6, and transmits the red light beam toward the +X direction parallel to the illumination optical axis Ax5. It should be noted that the green light beam thus separated enters the field lens 751 for green.

The reflecting mirror 733 corresponds to a third reflecting member, and is located at a crossing region between the illumination optical axes Ax4, Ax8. The reflecting mirror 733 reflects the blue light beam, which is propagating toward the +Z direction, toward the +X direction parallel to the illumination optical axis Ax8 to enter the field lens 751 for blue along the illumination optical axis Ax8.

Configuration of Relay Device

The relay device 74 is provided with an incident lens 741, a reflecting mirror 742, a relay lens 743, and a reflecting mirror 744.

The incident side lens 741 is located on the illumination optical axis Ax5, and the reflecting mirror 742 (a first reflecting member) is located at a crossing region between the illumination optical axes Ax5, Ax7. The relay lens 743 is located on the illumination optical axis Ax7, and the reflecting mirror 744 (a second reflecting member) is located at a crossing region between the illumination optical axes Ax7, Ax8.

Due to such a relay device 74, the red light beam thus separated propagates from the dichroic mirror 732 toward the +X direction, and enters the reflecting mirror 742 via the incident side lens 741. The red light beam having been reflected by the reflecting mirror 742 toward the +Z direction side enters the reflecting mirror 744 via the relay lens 743. Then, the red light beam having been reflected by the reflecting mirror 744 toward the −X direction side enters the field lens 751 for red.

It should be noted that the relay device 74 is provided with a configuration of transmitting the red light beam in the present embodiment, but is not limited to this configuration, and can also be provided with a configuration of transmitting, for example, the blue light beam.

Configuration of Electro-optic Device

The electro-optic device 75 modulates the colored light beams entering the electro-optic device 75 for each colored light beam, and combines the colored light beams thus modulated with each other to form an image corresponding to the image information described above. The electro-optic device 75 is provided with the field lenses 751 and the light modulation devices 752 disposed corresponding respectively to the three colored light beams described above, and a single color combining device 753.

Among these, the field lens 751 and the light modulation device 752 (752B) which the blue light beam enters, and the field lens 751 and the light modulation device 752 (752R) which the red light beam enters are disposed on the illumination optical axis Ax8. Further, the field lens 751 and the light modulation device 752 (752G) which the green light beam enters are disposed on the illumination optical axis Ax6. Further, the light modulation device 752B corresponds to a first light modulation device, the light modulation device 752G corresponds to a second light modulation device, and the light modulation device 752R corresponds to a third light modulation device.

As each of these light modulation devices 752, in the present embodiment, there is adopted a liquid crystal light valve having a transmissive liquid crystal panel having a plane of incidence of light and a light emission surface different from each other, and a pair of polarization plates respectively located on the light incident side and the light emission side of the liquid crystal panel.

The color combining device 753 is disposed at a crossing region between the illumination optical axes Ax6, Ax8, and combines the colored light beams modulated by the respective color modulation devices 752 with each other. The color combining device 753 is formed of a cross dichroic prism having a roughly rectangular solid shape in the present embodiment.

Such a color combining device 753 has planes of incidence 753B, 753G, and 753R, and an emission surface 753E.

The plane of incidence 753B corresponds to a first plane of incidence, and is a plane perpendicular to the +X direction. The blue light beam having passed through the light modulation device 752B enters the plane of incidence 753B along the +X direction.

The plane of incidence 753G corresponds to a second plane of incidence, and is a plane perpendicular to the +Z direction. The green light beam having passed through the light modulation device 752G enters the plane of incidence 753G along the +Z direction.

The plane of incidence 753R corresponds to a third plane of incidence, and is a plane perpendicular to the +X direction. The red light beam having passed through the light modulation device 752R enters the plane of incidence 753R along the −X direction.

The emission surface 753E is a plane perpendicular to the +Z direction, and is located on the opposite side to the plane of incidence 753G. The emission surface 753E emits the image light obtained by combining these colored light beams with each other toward the +Z direction.

Thus, the image light enters the projection optical device 8.

Configuration of Projection Optical Device

The projection optical device 8 projects the image light entering the projection optical device 8 from the image forming device 7 (the color combining device 753) on the projection target surface in an enlarged manner. The projection optical device 8 is configured as a combination lens having a plurality of lenses arranged in a lens barrel. The projection direction of the image by such a projection optical device 8 is a direction parallel to the optical axis of the projection optical device 8 in the case (the case of being viewed from the +Y direction side) of being viewed along the +Y direction.

It should be noted that the plurality of lenses includes a focusing lens for adjusting the focus of the image to be displayed by projecting the image light described above, and a zoom lens for adjusting a zoom state of the image. Further, although not shown in the drawings, the lens barrel is provided with an adjusting device for adjusting the positions in the optical axis of the focus lens and the zoom lens.

Dimensions of Illumination Device and Image Forming Device

As described above, in the projector 1, the image projection device 4A is provided with a two-story structure, wherein the illumination device 5A and the reflecting member 61 of the light guide device 6 are disposed in the first floor part, and the reflecting member 62 of the light guide device 6, the image forming device 7, and the projection optical device 8 are disposed in the second floor part. Further, the image forming device 7 is disposed so that at least a part of the image forming device 7 overlaps at least a part of the illumination device 5A in the +Y direction.

Thus, as shown in FIG. 4 through FIG. 7, it is possible to reduce the area in which the components constituting the image projection device 4A are disposed compared to the case in which the illumination device 5A and the image forming device 7 are disposed on the same plane.

Further, by adopting the illumination device 5A, the light guide device 6, and the image forming device 7 having the configurations described above, it is possible to make the area of the illumination device 5A in the first floor part and the area of the image forming device 7 in the second floor part roughly coincide with each other. In other words, as shown in FIG. 4 and FIG. 5, it is possible to make the dimension in the +X direction in the configuration area of the illumination device 5A and the dimension in the +X direction in the configuration area of the image forming device 7 roughly coincide with each other. Further, as shown in FIG. 4 through FIG. 7, it is possible to make the dimension in the +Z direction in the configuration area of the illumination device 5A and the dimension in the +Z direction in the configuration area of the image forming device 7 roughly coincide with each other.

Figure 9:
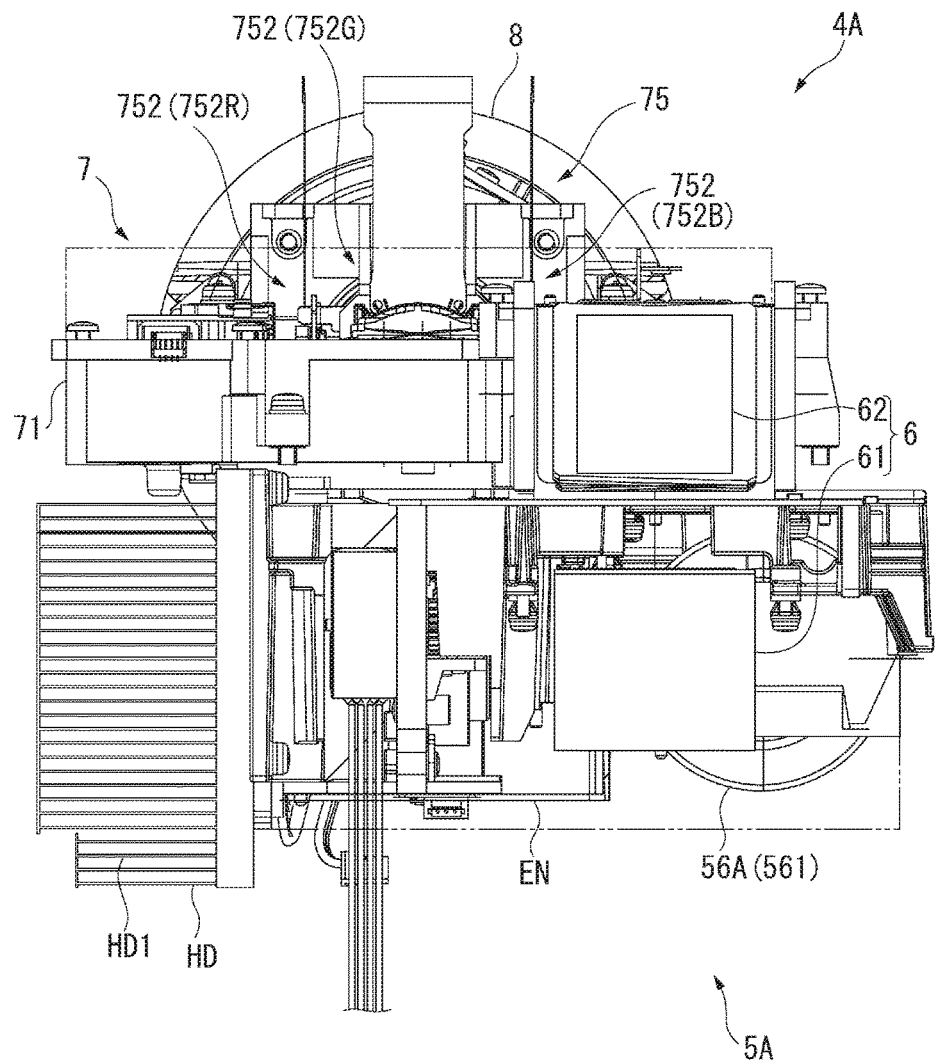
FIG. 9 is a back view showing the image projection device in the first embodiment.

Further, as shown in FIG. 8 and FIG. 9, it is possible to make the area of the illumination device 5A in the first floor part described above and the area of the image forming device 7 in the second floor part roughly coincide with each other viewed from the +Z direction side or the −Z direction side. In the detailed description, it is possible to make the dimension in the +Y direction in the configuration area of the illumination device 5A and the dimension in the +Y direction in the configuration area of the image forming device 7 roughly coincide with each other.

Thus, it is possible to configure the image projection device 4A so that the outline in the case of being viewed from the −Z direction side becomes a roughly square shape, and by extension, it is possible to configure the projector 1 having a roughly square outline in the case of being viewed form the −Z direction side, and a roughly rectangular solid overall shape as shown in FIG. 1.

Therefore, it is possible to easily perform the operation in the case of rotating the projector 1 around the +Z direction to change the posture of the projector 1.

Advantages of First Embodiment

According to the projector 1 related to the present embodiment described hereinabove, the following advantages can be exerted.

In the projector 1, the two-story structure is provided to the image projection device 4A, and the illumination device 5A is disposed in the first floor part, and the image forming device 7 is disposed in the second floor part located in the +Y direction with respect to the first floor part. In other words, the illumination device 5A and the image forming device 7 are disposed so that at least a part of the illumination device 5A and at least a part of the image forming device 7 overlap each other in the +Y direction. According to the above, it is possible to reduce the area occupied by the illumination device 5A and the image forming device 7 in the case of being viewed along the +Y direction compared to the case of arranging the illumination device 5A and the image forming device 7 on the same plane. Therefore, it is possible to reduce the configuration area of the projector 1.

The light guide device 6 emits the illumination light which is emitted toward the −Z direction side from the illumination device 5A toward the +Z direction side to enter the image forming device 7. According to the above, among the illumination device 5A and the image forming device 7 disposed in a state of at least partially overlapping each other in the +Y direction, the illumination light emitted from the illumination device 5A toward the −Z direction can surely be made to enter the image forming device 7 due to the function of the light guide device 6.

The image forming device 7 is provided with the color separation device 73 for separating the illumination light entering the image forming device 7 into the plurality of colored light beams, the plurality of light modulation devices 752 disposed in accordance with the colored light beams separated by the color separation device 73, and the color combining device 753 for combining the plurality of colored light beams entering the color combining device 753 from the light modulation devices 752 with each other to form the image. Among these, the color separation device 73 has the dichroic mirror 731 (the first color separation element) for separating the illumination light into the blue light beam (the first colored light beam) propagating toward the +Z direction and another colored light beam propagating toward the +X direction, and the dichroic mirror 732 (the second color separation element) for separating the another colored light, which is separated by the mirror 731, into the green light beam (the second colored light beam) propagating toward the +Z direction and the red light beam (the third colored light beam) propagating toward the +X direction. According to the above, the +Z direction and the +X direction can be defined as propagating directions of the respective colored light beams separated from the illumination light by the color separation device 73. Further, since the image forming device 7 is located on the +Y direction side with respect to the illumination device 5A, it is possible to design the optical system of the image forming device 7 independently of that of the illumination device 5A.

The image forming device 7 is provided with the homogenizing device 72 disposed on the light path of the illumination light entering the homogenizing device 72 from the light guide device 6, and adapted to homogenize the illuminance distribution of the illumination light, and at the same time uniform the polarization direction. According to the above, the colored light beams homogenized in illuminance distribution and polarization direction are made to enter the respective light modulation devices 752. Thus, it is possible to prevent the color shading and deterioration in contrast from occurring in the image formed by the image forming device 7, namely the image to be projected by the projection optical device 8.

Further, in the case in which the illumination device 5A is larger than a part of the image forming device 7 from which the homogenizing device 72 is excluded (in other words, in the case in which the area of the illumination device 5A in the first floor part is larger than the area of the image forming device 7 from which the homogenizing device 72 is excluded in the second floor part), since the image forming device 7 has the homogenizing device 72, it is possible to make it easy to uniform the area occupied by the illumination device 5A and the area occupied by the image forming device 7 in the case of being viewed along the +Y direction. Therefore, it is possible to further miniaturize the projector 1.

Further, since such a homogenizing device 72 is disposed between the light guide device 6 and the color separation device 73, it is possible to shorten the light path length between the homogenizing device 72 and the light modulation devices 752 compared to the case in which the homogenizing device 72 is disposed between the illumination device 5A and the light guide device 6. Therefore, it is possible to make it easy to superimpose the plurality of partial light beams, which are divided into by the first lens array 721 and then superimposed by the second lens array 722 and the superimposing lens 724, on each of the light modulation devices 752.

Due to the configuration of the image forming device described above, the colored light beams respectively modulated by the corresponding light modulation devices 752B, 752G, and 752R enter the planes of incidence 753B, 753G, and 753R as the first through third planes of incidence in the color combining device 753 from the three sides, respectively. Then, the image combined by the color combining device 753 is emitted toward the projection optical device 8 from the emission surface 753E located on the opposite side to the plane of incidence 753G. According to such a configuration, in the image forming device 7, it is possible to form the area where the color separation device 73, the light modulation devices 752 and the color combining device 753 are disposed so as to have a rectangular shape. Therefore, it is possible to compactly dispose the configuration of the image forming device 7, and by extension, it is possible to make it easy to arrange the image forming device 7 so as to overlap the illumination device 5A.

The illumination device 5A has the light source section 50 for emitting the source light, the separating/combining element 54 for separating the first source light and the second source light from the source light, the wavelength conversion section 562 for emitting the fluorescence as the converted light obtained by performing the wavelength conversion on the first source light separated by the separating/combining element 54, the light diffusion section 563 for diffusing the second source light separated by the separating/combining element 54, and the radiation member HD for radiating the heat of the light source section 50. Among these, the light source section 50 emits the source light toward the −X direction, the separating/combining element 54 emits the illumination light, which is obtained by combining the fluorescence emitted from the wavelength conversion section 562 and the second source light diffused by the light diffusion section 563 with each other, toward the light guide device 6 in the −Z direction.

Further, the radiation member HD is located on the +X direction side with respect to the light source section 50. According to the above, since it is possible to set the light path extending along the +X direction and the −X direction in the illumination device 5A, it is possible to make it easy to make the dimension of the illumination device 5A in the +X direction and the dimension of the image forming device 7 in the same direction coincide with each other. Therefore, since it is possible to make it easy to make the dimensions of the first floor part and the second floor part coincide with each other, it is possible to miniaturize the projector 1.

The illumination device 5A has the reflecting member 58 (the second source light reflecting member) located on the −X direction side with respect to the separating/combining element 54, and adapted to reflect the second source light, which is separated by the separating/combining element 54 and propagates toward the −X direction, toward the +Z direction. Further, the wavelength conversion section 562 and the light diffusion section 563 are located on the same substrate 561 located on the +Z direction side with respect to the separating/combining element 54 and the reflecting member 58. Further, the separating/combining element 54 emits the first source light toward the +Z direction, and emits the second source light toward the −X direction.

Further, the separating/combining element 54 emits the fluorescence, which enters the separating/combining element 54 from the wavelength conversion section 562 toward the −Z direction, toward the −Z direction, and emits the second source light, which enters the separating/combining element 54 from the light diffusion section 563 via the reflecting member 58 in the +X direction, toward the −Z direction. According to the above, it is possible to reduce the dimension of the illumination device 5A in the +X direction compared to the case in which the wavelength conversion section 562 is located on the +Z direction side with respect to the separating/combining element 54, and the light diffusion section 563 is located on the +Z direction side with respect to the reflecting member 58 independently of the wavelength conversion section 562. Therefore, it is possible to miniaturize the illumination device 5A. Further, thus, it is possible to make it easy to arrange the illumination device 5A and the image forming device 7 so as to overlap each other in the +Y direction.

The wavelength conversion device 56A is provided with the rotating device 564 for rotating the substrate 561, in which the wavelength conversion section 562 and the light diffusion section 563 are located, around the rotational axis parallel to the +Z direction. According to the above, since it is possible to change the incident position of the first source light in the wavelength conversion section 562, it is possible to prevent light saturation from occurring in the wavelength conversion section 562. Similarly, it is possible to change the state of the diffusion in accordance with the change of the incident position of the second source light in the light diffusion section 563. Thus, by temporally overlapping the diffused light changing in the state of the diffusion, it is possible to achieve reduction of the speckle noise, and thus it is possible to prevent flickers from occurring in the image displayed.

Further, since the rotating device 564 rotates the substrate 561 described above, it is possible to simplify the configuration of the illumination device, and in addition, it is possible to further miniaturize the illumination device compared to the case in which the wavelength conversion section 562 and the light diffusion section 563 are disposed on respective substrates separate from each other, and the rotating device is provided to each of the substrates.

The light guide device 6 has the reflecting members 61, 62 for reflecting the illumination light entering the light guide device 6 from the illumination device 5A toward the image forming device 7. According to the above, it is possible to adopt a simple configuration to the light guide device 6. Therefore, it is possible to simplify the configuration of the light guide device 6, and by extension, it is possible to simplify the configuration of the projector 1.

Second Embodiment

Then, a second embodiment of the invention will be described.

A projector according to the present embodiment is different from the projector 1 described above in the point that the configuration and the layout of the illumination device are different. It should be noted that in the description below, a part which is the same or substantially the same as the part having already been described is denoted by the same reference symbol, and the description thereof will be omitted.

Figure 12:
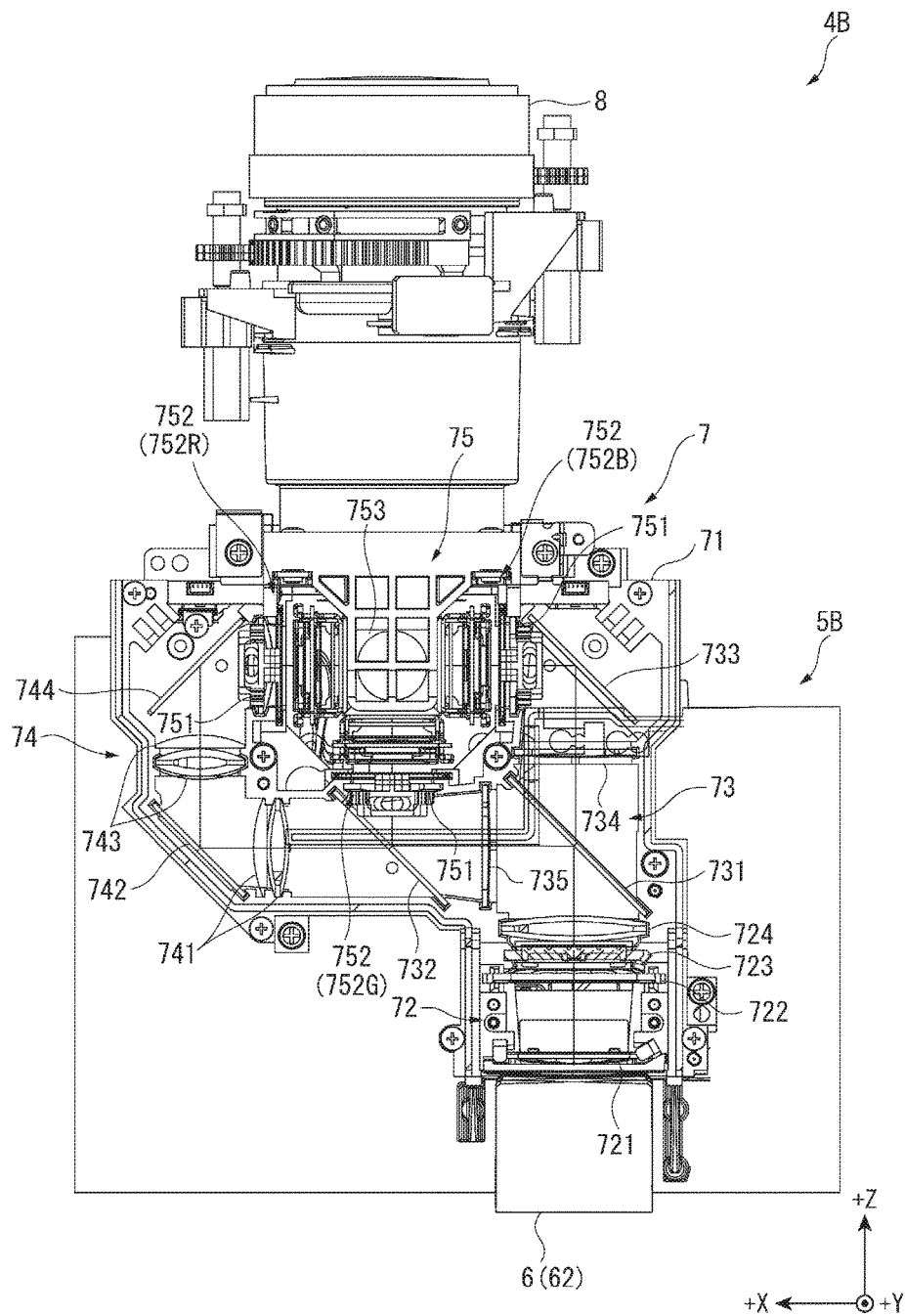
FIG. 12 is a plan view showing an image projection device provided to a projector according to a second embodiment of the invention.
Figure 13:
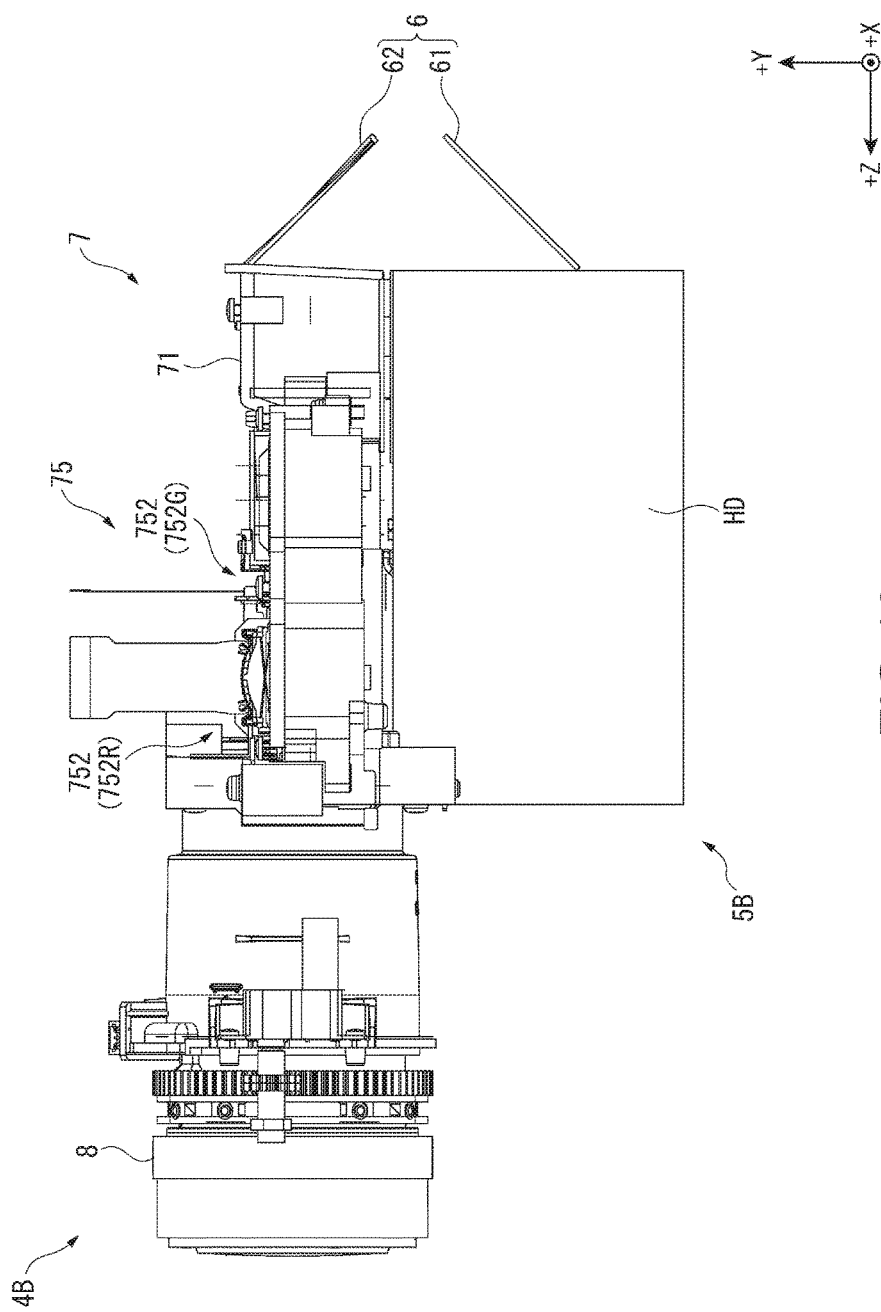
FIG. 13 is a right side view showing the image projection device in the second embodiment.
Figure 14:
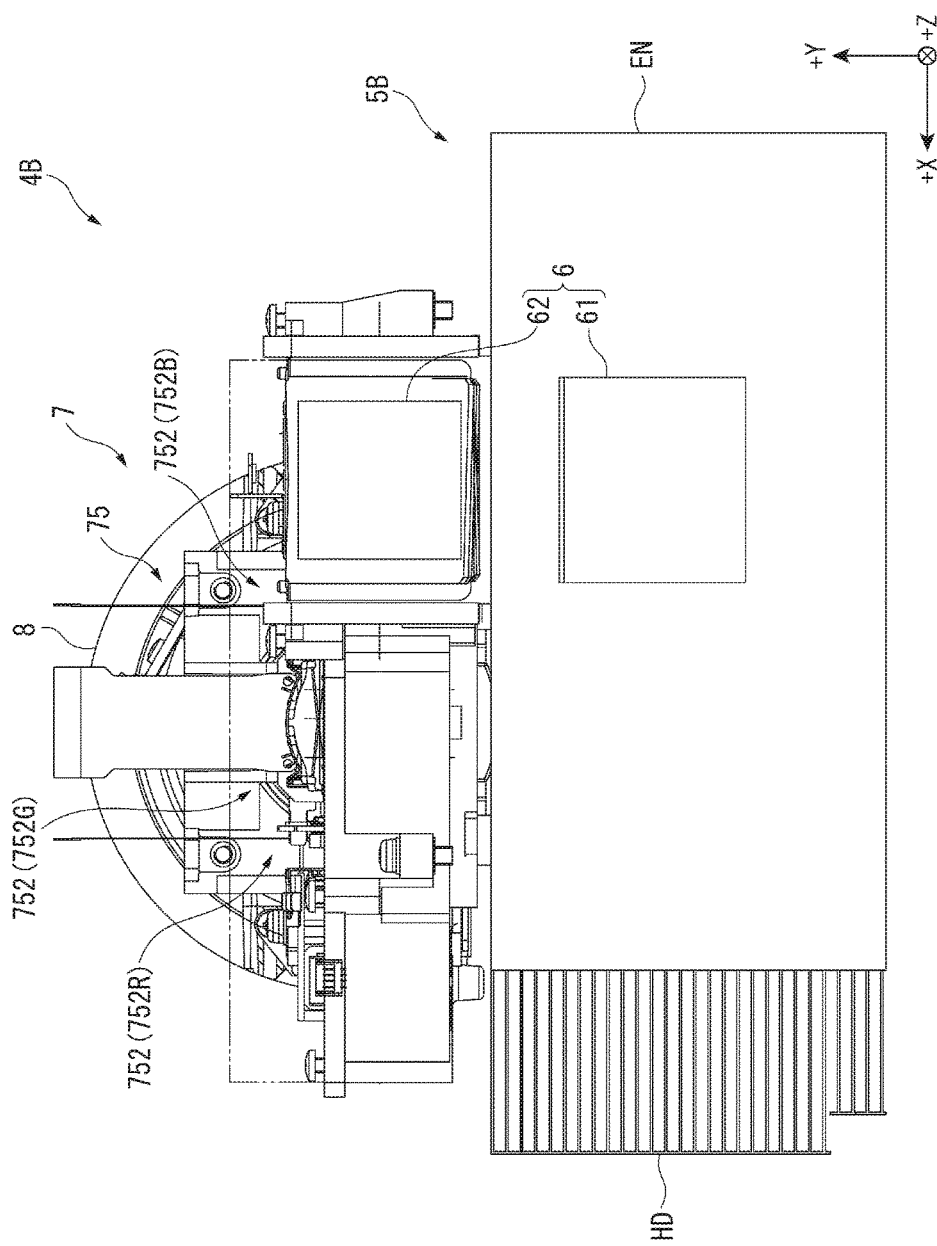
FIG. 14 is a back view showing the image projection device in the second embodiment.

FIG. 12 through FIG. 14 are diagrams showing a configuration of an image projection device 4B provided to the projector according to the present embodiment. Specifically, FIG. 12 through FIG. 14 are a plane view (a top view), a right side view, and a back view of the image projection device 4B viewed from the +Y direction side, +X direction side, and −Z direction side, respectively. It should be noted that in FIG. 14, the outline of the image forming device 7 is supplementarily indicated by the dashed-two dotted lines.

The projector according to the present embodiment has substantially the same configuration and functions as those of the projector 1 described above except the point that the image projection device 4B is provided instead of the image projection device 4A.

Further, as shown in FIG. 12 through FIG. 14, the image projection device 4B has substantially the same configuration as that of the image projection device 4A described above except the point that an illumination device 5B is provided instead of the illumination device 5A. In other words, the image projection device 4B is provided with the illumination device 5B, the light guide device 6, the image forming device 7 and the projection optical device 8. In this image projection device 4B, there is provided a two-story structure in which the illumination device 5B and the reflecting member 61 are disposed in the first floor part, and the reflecting member 62, the image forming device 7 and the projection optical device 8 are disposed in the second floor part. Further, the image forming device 7 is disposed so that at least a part of the image forming device 7 overlaps at least a part of the illumination device 5B in the +Y direction.

Hereinafter, the configuration of the illumination device 5B will be described in detail.

Configuration of Illumination Device

Figure 15:
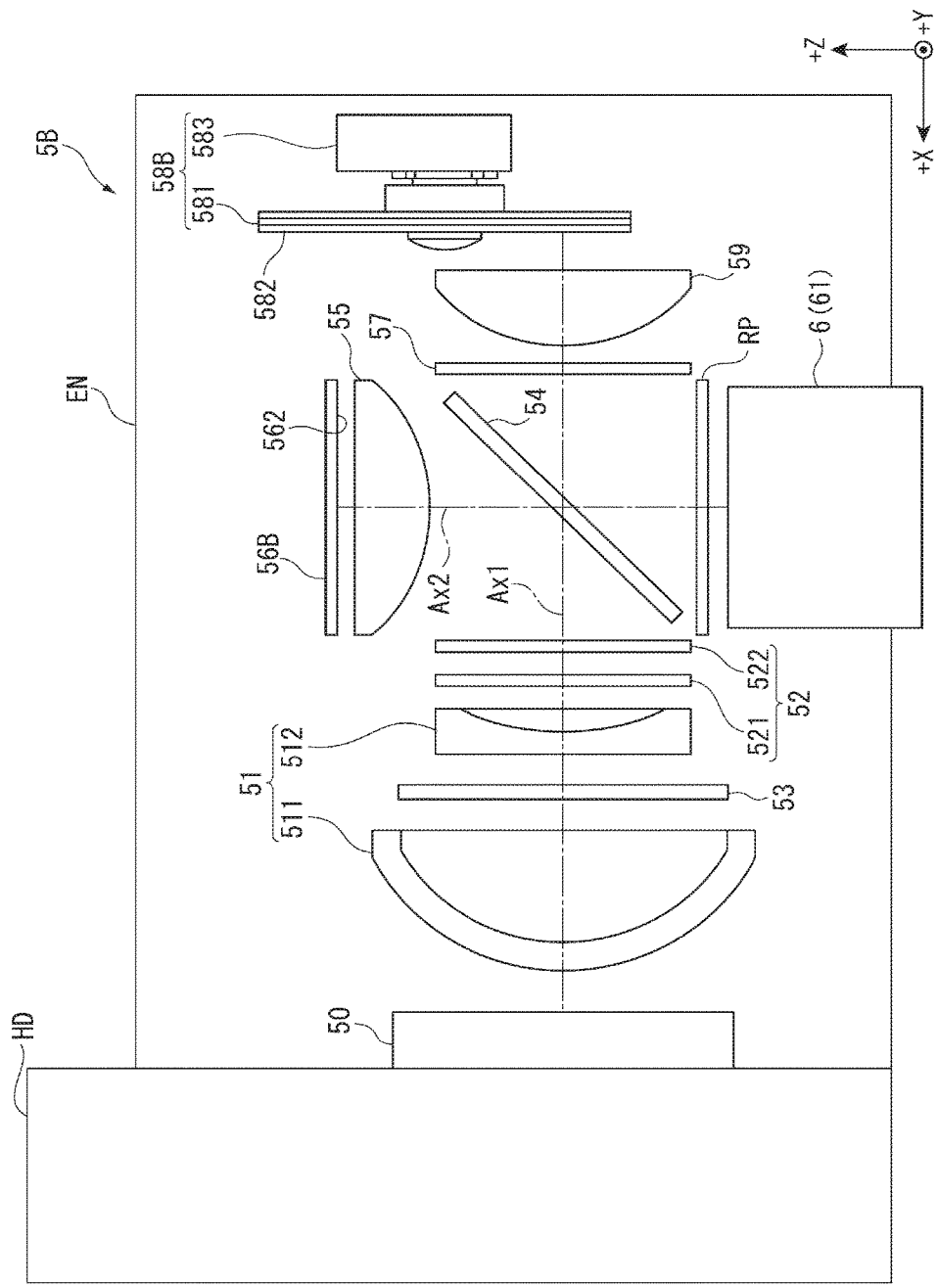
FIG. 15 is a schematic diagram showing a configuration of an illumination device in the second embodiment.

FIG. 15 is a schematic diagram showing a configuration of the illumination device 5B in the case of being viewed from the +Y direction side.

Similarly to the illumination device 5A described above, the illumination device 5B emits the illumination light entering the image forming device 7 located on the +Y direction side via the light guide device 6 located on the −Z direction side. As shown in FIG. 15, the illumination device 5B is provided with the light source section 50, the afocal optical element 51, the homogenizer optical element 52, the first retardation element 53, the separating/combining element 54, the first light collection element 55, a wavelength conversion element 56B, the second retardation element 57, a diffusely reflecting device 58B, the second light collection element 59, and the retardation element RP, the housing EN for housing these constituents inside, and the radiation member HD.

Among these constituents, the light source section 50, the afocal optical element 51, the first retardation element 53, the homogenizer optical element 52, the separating/combining element 54, the second retardation element 57 and the diffusely reflecting device 58B are arranged on the illumination optical axis Ax1 parallel to the +X direction in this order from the +X direction side. It should be noted that the first retardation element 53 is disposed between the lenses 511, 512 constituting the afocal optical element 51.

Further, the wavelength conversion element 56B, the first light collection element 55, the separating/combining element 54 and the retardation element RP are arranged on the illumination optical axis Ax2 parallel to the +Z direction in this order from the +Z direction side. In other words, the separating/combining element 54 is disposed at the crossing region between the illumination optical axes Ax1, Ax2. The illumination optical axis Ax2 is set at a position overlapping the illumination optical axis Ax4 described above viewed from the +Y direction side.

It should be noted that the illumination optical axes Ax1, Ax2 are not required to be perpendicular to each other, but are only required to cross each other.

Among these, the wavelength conversion element 56B has a substrate, and the wavelength conversion section 562 described above on a surface on the light incident side of the substrate although not shown in the drawings in detail. Further, when the first source light out of the source light having been emitted from the light source section 50 enters the wavelength conversion section 562 from the −Z direction side via the separating/combining element 54 and the first light collection element 55, the wavelength conversion element 56B emits the fluorescence described above as the converted light toward the incident side of the first source light, namely the −Z direction side.

Further, the diffusely reflecting device 58B is provided with a diffusely reflecting element 581 having a light diffusion section 582 on the surface on the light incident side, and a rotating device 583 for rotating the diffusely reflecting element 581 around a rotational axis (a rotational axis parallel to the +X direction) parallel to the illumination optical axis Ax1. Further, when the second source light out of the source light having been emitted from the light source section 50 enters the light diffusion section 582 from the +X direction side via the separating/combining element 54 and the second light collection element 59, the light diffusion section 582 diffusely reflects the second source light toward the +X direction side. As such a light diffusion section 582, there can be illustrated a configuration of performing the Lambert reflection on the incident light.

In such an illumination device 5B, the source light having been emitted from the light source section 50 toward the −X direction is reduced in diameter by the afocal optical element 51, and at the same time converted into the source light having the first source light as the s-polarized light and the second source light as the p-polarized light mixed with each other by the first retardation element 53. Then, the source light enters the separating/combining element 54 via the homogenizer optical element 52.

Due to the separating/combining element 54, the first source light as the s-polarized light is reflected toward the +Z direction side, and then enters the wavelength conversion element 56B via the first light collection element 55 along the illumination optical axis Ax2. The fluorescence generated by the wavelength conversion element 56B propagates toward the −Z direction side along the illumination optical axis Ax2, and then enters the separating/combining element 54 passing through the first light collection element 55 once again.

In contrast, the second source light as the p-polarized light enters the light diffusion section 582 of the diffusely reflecting device 58B via the second retardation element 57 and the second light collection element 59. The second source light having been diffusely reflected by the light diffusion section 582 propagates toward the +X direction side along the illumination optical axis Ax1, then passes through the second light collection element 59 and the second retardation element 57 once again, and then enters the separating/combining element 54 as the second source light as the s-polarized light.

Due to the characteristics described above, the separating/combining element 54 transmits the fluorescence toward the −Z direction side, and reflects the second source light as the s-polarized light toward the −Z direction side.

The fluorescence and the second source light are converted into circularly-polarized light in the process of passing through the retardation element RP in the −Z direction, and then enter the reflecting member 61 of the light guide device 6 located on the −Z direction side with respect to the illumination device 5B as the illumination light.

The illumination light having entered the reflecting member 61 in such a manner is reflected toward the +Y direction side, then reflected by the reflecting member 62 toward the +Z direction side, and then enters the homogenizing device 72 (the first lens array 721) of the image forming device 7 described above similarly to the case in the image projection device 4A described above.

It should be noted that the wavelength conversion element 56B is not provided with the rotating device for rotating the wavelength conversion element 56B. However, besides the above, it is also possible to adopt a configuration in which the wavelength conversion element 56B is rotated by the rotating device.

In contrast, the diffusely reflecting device 58B is provided with the configuration in which the diffusely reflecting element 581 is rotated by the rotating device 583. However, besides the above, it is also possible to adopt a configuration in which the diffusely reflecting element 581 is not rotated.

In such an illumination device 5B, since the light source section 50 is located on the +X direction side in the housing EN, the radiation member HD for radiating the heat transferred from the light source section 50 is disposed adjacent to the housing EN on the +X direction side.

Further, in the illumination device 5B, the light path length of the first source light from the separating/combining element 54 to the wavelength conversion element 56B and the light path length of the second source light from the separating/combining element 54 to the diffusely reflecting device 58B are the same. However, the source light emitted from the light source section 50 along the −X direction passes through the afocal optical element 51, the first retardation element 53, and the homogenizer optical element before entering the separating/combining element 54. Therefore, in the housing EN, the dimension in the +X direction is larger than the dimension in the +Z direction. In addition, the radiation member HD described above is disposed adjacent to the housing EN on the +X direction side. On the grounds of these facts, as shown in FIG. 12 through FIG. 14, the illumination device 5B is configured to have a roughly rectangular solid shape larger in dimension in the +X direction than in the +Z direction.

Advantages of Second Embodiment

According to the projector related to the present embodiment described hereinabove, in addition to the advantages substantially the same as those of the projector 1 described above, the following advantages can be obtained.

In the illumination device 5B, the wavelength conversion section 562 is located on the +Z direction side with respect to the separating/combining element 54, and the light diffusion section 582 is located on the −X direction side with respect to the separating/combining element 54. The separating/combining element 54 emits the first source light toward the +Z direction, and emits the second source light toward the −X direction. Further, the separating/combining element 54 emits the fluorescence (the converted light), which enters the separating/combining element 54 from the wavelength conversion section 562 toward the −Z direction, toward the −Z direction, and emits the second source light, which enters the separating/combining element 54 from the light diffusion section 582 in the +X direction, toward the −Z direction.

According to the above, since the wavelength conversion section 562 and the light diffusion section 582 are disposed so as to be separated from each other, it is possible to make it difficult to transfer the heat of one of the wavelength conversion section 562 and the light diffusion section 582 to the other. Therefore, it is possible to suppress the deterioration of the wavelength conversion section 562 and the light diffusion section 582. Further, thus it is possible to adopt the light source section 50 for emitting the high-intensity source light, and therefore, it is possible to configure the illumination device 5B for emitting the high-intensity illumination light, and by extension, it is possible to configure the projector capable of projecting a high-intensity image.

Third Embodiment

Then, a third embodiment of the invention will be described.

A projector according to the present embodiment is different from the projector 1 described above in the point that the configuration and the layout of the illumination device are different. It should be noted that in the description below, a part which is the same or substantially the same as the part having already been described is denoted by the same reference symbol, and the description thereof will be omitted.

Figure 16:
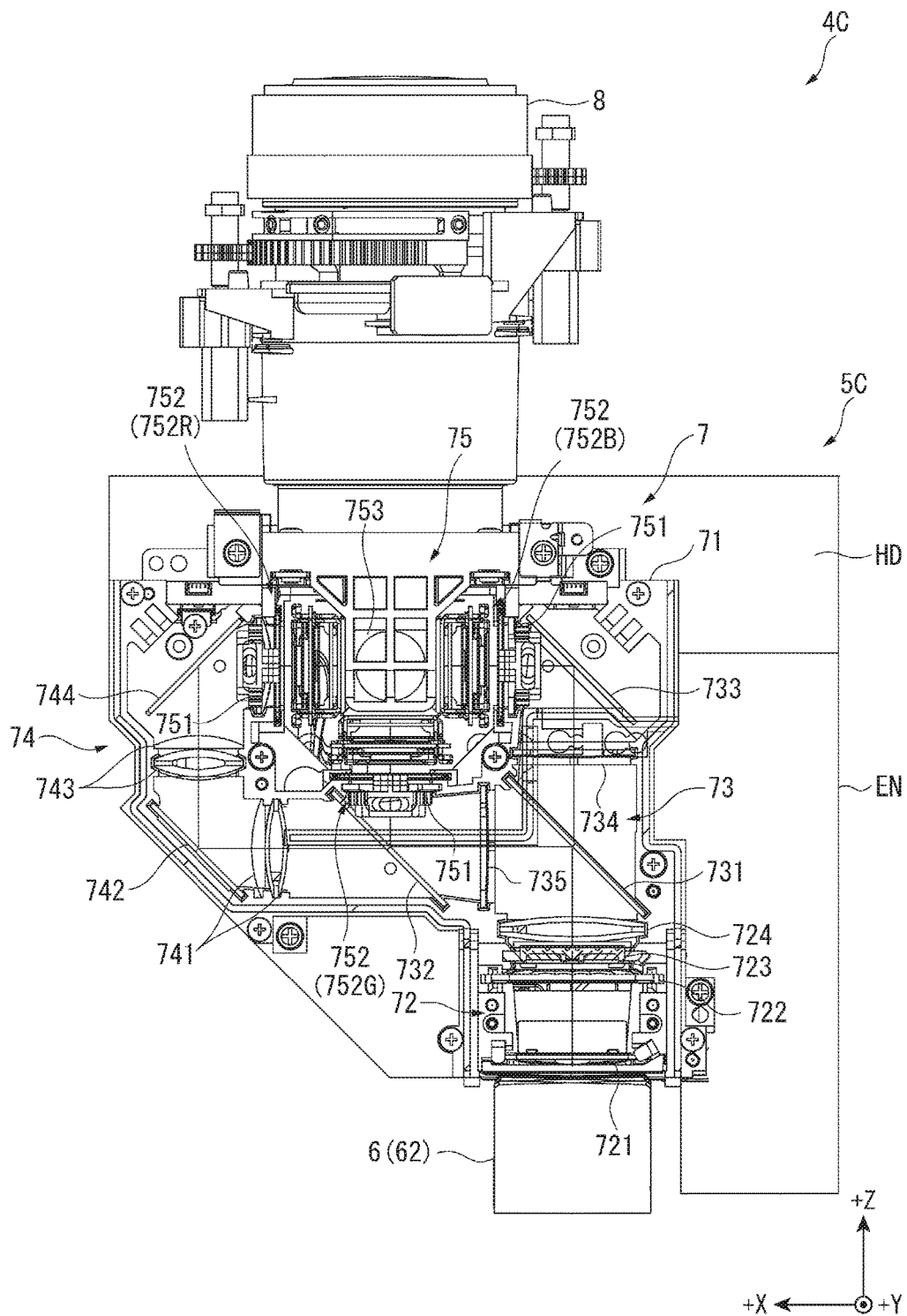
FIG. 16 is a plan view showing an image projection device provided to a projector according to a third embodiment of the invention.
Figure 17:
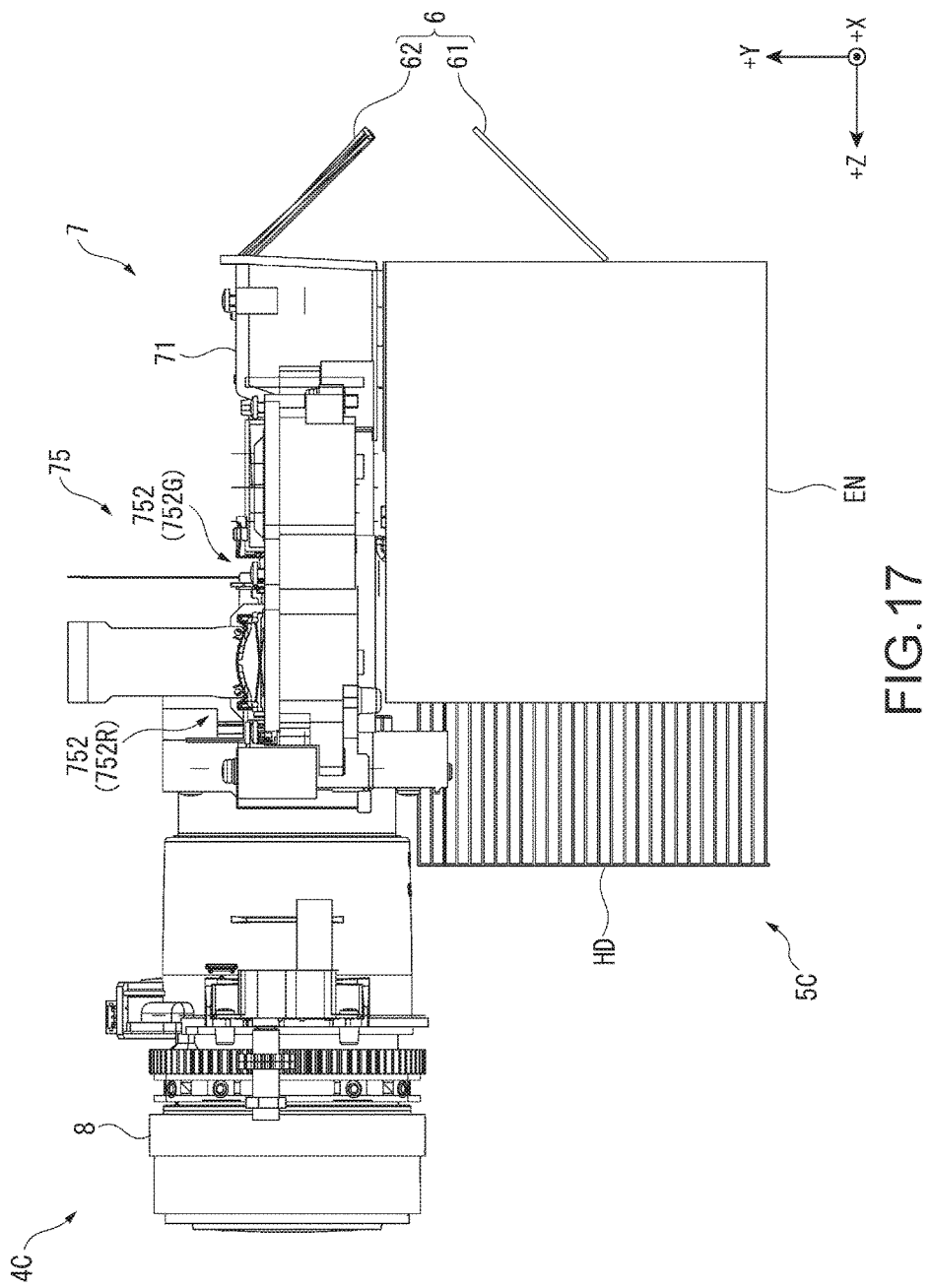
FIG. 17 is a right side view showing the image projection device in the third embodiment.
Figure 18:
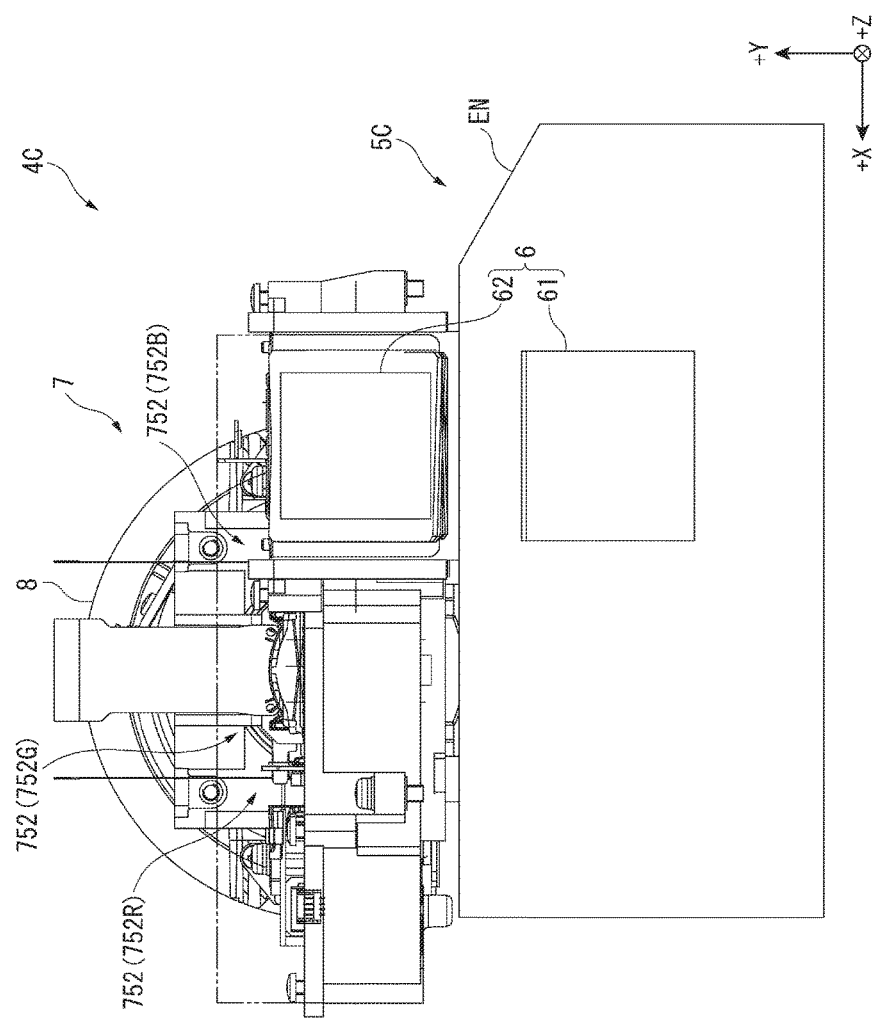
FIG. 18 is a back view showing the image projection device in the third embodiment.

FIG. 16 through FIG. 18 are diagrams showing a configuration of an image projection device 4C provided to the projector according to the present embodiment. Specifically, FIG. 16 through FIG. 18 are a plane view (a top view), a right side view, and a back view of the image projection device 4C viewed from the +Y direction side, +X direction side, and −Z direction side, respectively. It should be noted that in FIG. 18, the outline of the image forming device 7 is supplementarily indicated by the dashed-two dotted lines.

The projector according to the present embodiment has substantially the same configuration and functions as those of the projector 1 described above except the point that the image projection device 4C is provided instead of the image projection device 4A.

As shown in FIG. 16 through FIG. 18, the image projection device 4C has substantially the same configuration as that of the image projection device 4A described above except the point that an illumination device 5C is provided instead of the illumination device 5A. In other words, the image projection device 4C is provided with the illumination device 5C, the light guide device 6, the image forming device 7 and the projection optical device 8. In this image projection device 4C, there is provided a two-story structure in which the illumination device 5C and the reflecting member 61 of the light guide device 6 are disposed in the first floor part, and the reflecting member 62 of the light guide device 6, the image forming device 7 and the projection optical device 8 are disposed in the second floor part. Further, the image forming device 7 is disposed on the +Y direction side with respect to the illumination device 5C so that at least a part of the image forming device 7 overlaps at least a part of the illumination device 5C.

Hereinafter, the configuration of the illumination device 5C will be described in detail.

Configuration of Illumination Device

Figure 19:
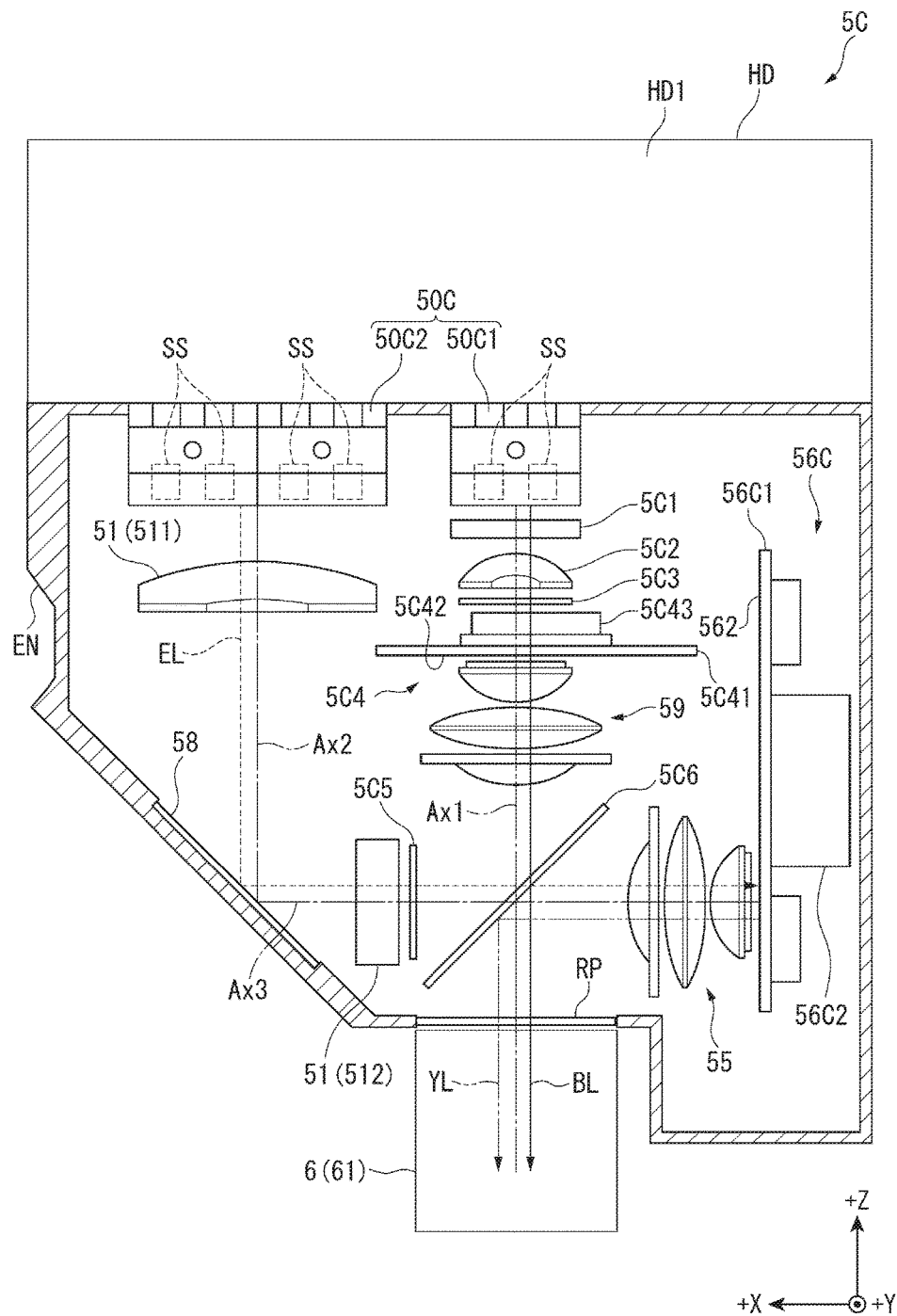
FIG. 19 is a schematic diagram showing a configuration of an illumination device in the third embodiment.

FIG. 19 is a schematic diagram showing a configuration of the illumination device 5C in the case of being viewed from the +Y direction side.

Similarly to the illumination devices 5A, 5B described above, the illumination device 5C emits the illumination light entering the image forming device 7 located on the +Y direction side via the light guide device 6 located on the −Z direction side. As shown in FIG. 19, the illumination device 5C has the afocal optical element 51, the first light collection element 55, the reflecting member 58 and the second light collection element 59, a light source section 50C and a wavelength conversion device 56C, a prism mirror 5C1, a condenser lens 5C2, an auxiliary diffusion element 5C3, a diffusion device 5C4, a diffusion element 5C5, a light combining element 5C6, the retardation element RP, and the radiation member HD.

Among these constituents, the first light source section 50C1 constituting the light source section 50C, the prism mirror 5C1, the condenser lens 5C2, the auxiliary diffusion element 5C3, the diffusion device 5C4, the second light collection element 59, the light combining element 5C6 and the retardation element RP are disposed on the illumination optical axis Ax1 parallel to the +Z direction in this order from the +Z direction side. Further, the second light source section 50C2 constituting the light source section 50C, the first lens 511 of the afocal optical element 51, and the reflecting member 58 are disposed on the illumination optical axis Ax2 parallel to the illumination optical axis Ax1 in this order from the +Z direction side. Further, the reflecting member 58, the second lens 512 of the afocal optical element 51, the diffusion element 5C5, the light combining element 5C6, the first light collection element 55 and the wavelength conversion device 56C are disposed on the illumination optical axis Ax3 crossing each of the illumination axes Ax1, Ax2 along the +X direction in this order from the +X direction side. In other words, the light combining element 5C6 is disposed at the crossing region between the illumination optical axes Ax1, Ax3, and the reflecting member 58 is disposed at the crossing region between the illumination optical axes Ax2, Ax3. Among these, the illumination optical axis Ax1 is set at a position overlapping the illumination optical axis Ax4 described above viewed from the +Y direction side.

It should be noted that the illumination optical axes Ax1, Ax2 are not required to be completely parallel to each other. Further, the illumination optical axis Ax3 is not required to be perpendicular to each of the illumination optical axes Ax1, Ax2, but only required to cross these illumination optical axes Ax1, Ax2.

Configuration of Light Source Section

The light source section 50C has the first light source section 50C1 and the second light source section 50C2.

The first light source section 50C1 and the second light source section 50C2 are disposed side by side in the +X direction, and each emit the blue light toward the −Z direction. Among these, the second light source section 50C2 is disposed on the +X direction side with respect to the first light source section 50C1.

Each of the first light source section 50C1 and the second light source section 50C2 has a configuration in which a plurality of solid-state light sources SS described above is arranged in a matrix. It should be noted that in the present embodiment, the number of the solid-state light sources SS provided to the second light source section 50C2 is larger than the number of the solid-state light sources SS provided to the first light source section 50C1, and the light intensity of the blue light emitted by the second light source section 50C2 is higher than the light intensity of the blue light (blue light BL) emitted by the first light source section 50C1. This is because the blue light (excitation light EL) emitted by the second light source section 50C2 is used for generation of the fluorescence YL by the wavelength conversion device 56C. However, besides this configuration, it is also possible for the number of the solid-state light sources SS used in the second light source section 50C2 to be equal to or smaller than the number of the solid-state light sources SS used in the first light source section 50C1.

In the following description, the blue light emitted form the second light source section 50C2 and then converted into the fluorescence is referred to as the excitation light EL in some cases in order to distinguish such blue light from the blue light BL emitted from the first light source section 50C1 and included in the illumination light.

Configuration of Prism Mirror, Condenser Lens and Auxiliary Diffusion Element

The prism mirror 5C1 reduces the diameter of the blue light BL emitted toward the −Z direction from the first light source section 50C1.

The condenser lens 5C2 converges the blue light BL entering the condenser lens 5C2 from the prism mirror 5C1 to the diffusion device 5C4.

The auxiliary diffusion element 5C3 is for assisting the diffusion of the blue light BL by the diffusion device 5C4, and diffuses the blue light BL entering the auxiliary diffusion element 5C3 from the condenser lens 5C2 to adjust the beam diameter of the blue light entering the diffusion device 5C4.

Configuration of Diffusion Device and First Light Collection Element

The diffusion device 5C4 diffusely transmits the blue light BL entering the diffusion device 5C4 from the auxiliary diffusion element 5C3 at a predetermined diffusion ratio. Specifically, the diffusion device 5C4 is a transmissive diffusion device.

Such a diffusion device 5C4 has a substrate 5C41 having a light diffusion section 5C42 for diffusely transmitting the blue light BL entering the diffusion device 5C4, and a rotating device 5C43 for rotating the substrate 5C41 around a rotational axis parallel to the illumination optical axis Ax1. It should be noted that the light diffusion section 5C42 is located on the surface on the emission side of the blue light BL in the substrate 5C41, but can also be located on the surface on the incident side. Further, although the rotating device 5C43 can be eliminated, by rotating the substrate 5C41, reduction of the speckle can effectively be achieved.

The first light collection element 55 functions as a collimating element for collimating the blue light BL entering the first light collection element 55 from the diffusion device 5C4 to enter the light combining element 5C6 in the present embodiment.

Configuration of Afocal Optical Element and Reflecting Member

The afocal optical element 51 reduces the diameter of the excitation light EL emitted from the second light source section 50C2 in the present embodiment. Among the first lens 511 and the second lens 512 constituting the afocal optical element 51, the first lens 511 is disposed on the illumination optical axis Ax2 described above, and the second lens 512 is disposed on the illumination optical axis Ax3 described above.

The reflecting member 58 is a reflecting section located on the −Z direction side with respect to the second light source section 50C2. The reflecting member 58 reflects the excitation light EL, which enters the reflecting member 58 from the first lens 511 along the −Z direction, toward the −X direction side along the illumination optical axis Ax3 to make the excitation light EL enter the second lens 512.

Configuration of Diffusion Element

The diffusion element 5C5 is adopted instead of the homogenizer optical element 52 described above, and diffuses the excitation light EL entering the diffusion element 5C5 from the second lens 512 to homogenize the illuminance distribution of the excitation light EL. The excitation light EL having passed through such a diffusion element 5C5 passes through the light combining element 5C6 in the −X direction, and then enters the first light collection element 55.

The first light collection element 55 is disposed on the light incident side of the wavelength conversion device 56C disposed on the illumination optical axis Ax3 in the present embodiment.

Configuration of Wavelength Conversion Device

Similarly to the wavelength conversion device 56A described above, the wavelength conversion device 56C is a reflective wavelength conversion device for performing the wavelength conversion on the excitation light EL entering the wavelength conversion device 56C, and then emitting the fluorescence YL (in detail, the fluorescence YL including the green light and the red light, and the converted light by the wavelength conversion device 56C) different in wavelength from the excitation light EL toward the opposite direction to the incident direction of the excitation light EL. The wavelength conversion device 56C has a wavelength conversion element 56C1 and a rotating device 56C2 for rotating the wavelength conversion element 56C1 around a rotational axis parallel to the illumination optical axis Ax3.

Among these, the wavelength conversion element 56C1 has a wavelength conversion section 562 described above on a surface on the incident side of the excitation light EL although not shown in the drawings in detail. Further, the wavelength conversion section 562 emits the fluorescence YL toward the +X direction, and the fluorescence YL enters the light combining element 5C6 via the first light collection element 55.

Configuration of Light Combining Element and Retardation Element

The light combining element 5C6 corresponds to a light combining section, and is disposed so as to be tilted 45° with respect to each of the illumination optical axes Ax1, Ax3. The light combining element 5C6 is formed of a dichroic mirror for transmitting the blue light and reflecting the green light and the red light.

The light combining element 5C6 transmits the blue light BL entering the light combining element 5C6 from the +Z direction side along the illumination optical axis Ax1. Further, the light combining element 5C6 transmits the excitation light EL entering the light combining element 5C6 from the +X direction side along the illumination optical axis Ax3.

Further, the light combining element 5C6 reflects the fluorescence YL described above, which enters the light combining element 5C6 from the −X direction side along the illumination optical axis Ax3, toward the −Z direction side along the illumination optical axis Ax1.

Thus, the blue light BL entering the light combining element 5C6 from the second light collection element 59 and the fluorescence YL entering the light combining element 5C6 from the first light collection element 55 are emitted to the retardation element RP along the illumination optical axis Ax1 as the illumination light described above.

Further, the illumination light having passed through the retardation element RP in the −Z direction enters the image forming device 7 via the reflecting members 61, 62 of the light guide device 6 as described above.

As described above, the radiation member HD is a heat-sink having a plurality of fins HD1, and corresponds to a radiation section in the illumination device 5C. In the present embodiment, the radiation member HD is connected to the first light source section 50C1 and the second light source section 50C2, and radiates the heat transmitted from these light source sections 50C1, 50C2 to cool the light source sections 50C1, 50C2. Further, the radiation member HD also functions as a support member for supporting these light source sections 50C1, 50C2. Such a radiation member HD is located on the +Z direction side with respect to the light source sections 50C1, 50C2, and the dimension in the +X direction of the radiation member HD is roughly the same as the dimension in the +X direction of the housing EN of the illumination device 5C.

Advantages of Third Embodiment

According to the projector related to the present embodiment described hereinabove, in addition to the advantages substantially the same as those of the projector 1 described above, the following advantages can be obtained.

The illumination device 5C has the first light source section 50C1 for emitting the blue light BL toward the −Z direction, and the second light source section 50C2 for emitting the excitation light EL toward the −Z direction. Further, the illumination device 5C has the light diffusion section 5C42 located on the −Z direction side with respect to the first light source section 50C1 and diffusing the blue light BL entering the light diffusion section 5C42, and the reflecting member 58 (an excitation light reflecting section) located on the −Z direction side with respect to the second light source section 50C2 and reflecting the excitation light EL entering the reflecting member 58 toward the −X direction. Further, the illumination device 5C has the light combining element 5C6 (a light combining section) located on the −Z direction side with respect to the light diffusion section 5C42 and emitting the excitation light EL, which enters the light combining element 5C6 via the reflecting member 58, toward the −X direction, and the wavelength conversion section 562 located on the −X direction side with respect to the light combining element 5C6, and emitting the fluorescence YL (converted light) obtained by performing the wavelength conversion on the excitation light EL entering the wavelength conversion section 562. Besides the above, the illumination device 5C has the radiation member HD (a radiation section) located on the +Z direction side with respect to the light source sections 50C1, 50C2, and adapted to radiate the heat transferred from the light source sections 50C1 and 50C2. Among these, the light combining element 5C6 emits the blue light BL, which enters the light combining element 5C6 from the light diffusion section 5C42, and the fluorescence YL, which enters the light combining element 5C6 from the wavelength conversion section 562, toward the −Z direction.

According to the above, since the constituents described above can densely be arranged, it is possible to miniaturize the illumination device 5C. Besides the above, since the first light source section 50C1 and the second light source section 50C2 are separated from each other, by adjusting the light intensity of the blue light BL emitted from the first light source section 50C1 and the light intensity of the excitation light EL emitted from the second light source section 50C2, it is possible to easily adjust the white balance of the illumination light emitted from the illumination device 5C. Further, since there is no need to separate the blue light BL and the excitation light EL from each other using polarized light, it is possible to adopt the dichroic mirror for transmitting the blue light and reflecting the green light and the red light as the light combining element 5C6. Thus, it is possible to make the light combining element 5C6 simple in configuration, and in addition, it is possible to prevent the deterioration in the light utilization efficiency due to depolarization in the optical element such as the light diffusion section 5C42 and the lens from occurring.

Fourth Embodiment

Then, a fourth embodiment of the invention will be described.

A projector according to the present embodiment is different from the projector 1 described above in the point that an illumination device for emitting the illumination light toward the +Y direction is adopted. It should be noted that in the description below, a part which is the same or substantially the same as the part having already been described is denoted by the same reference symbol, and the description thereof will be omitted.

Figure 20:
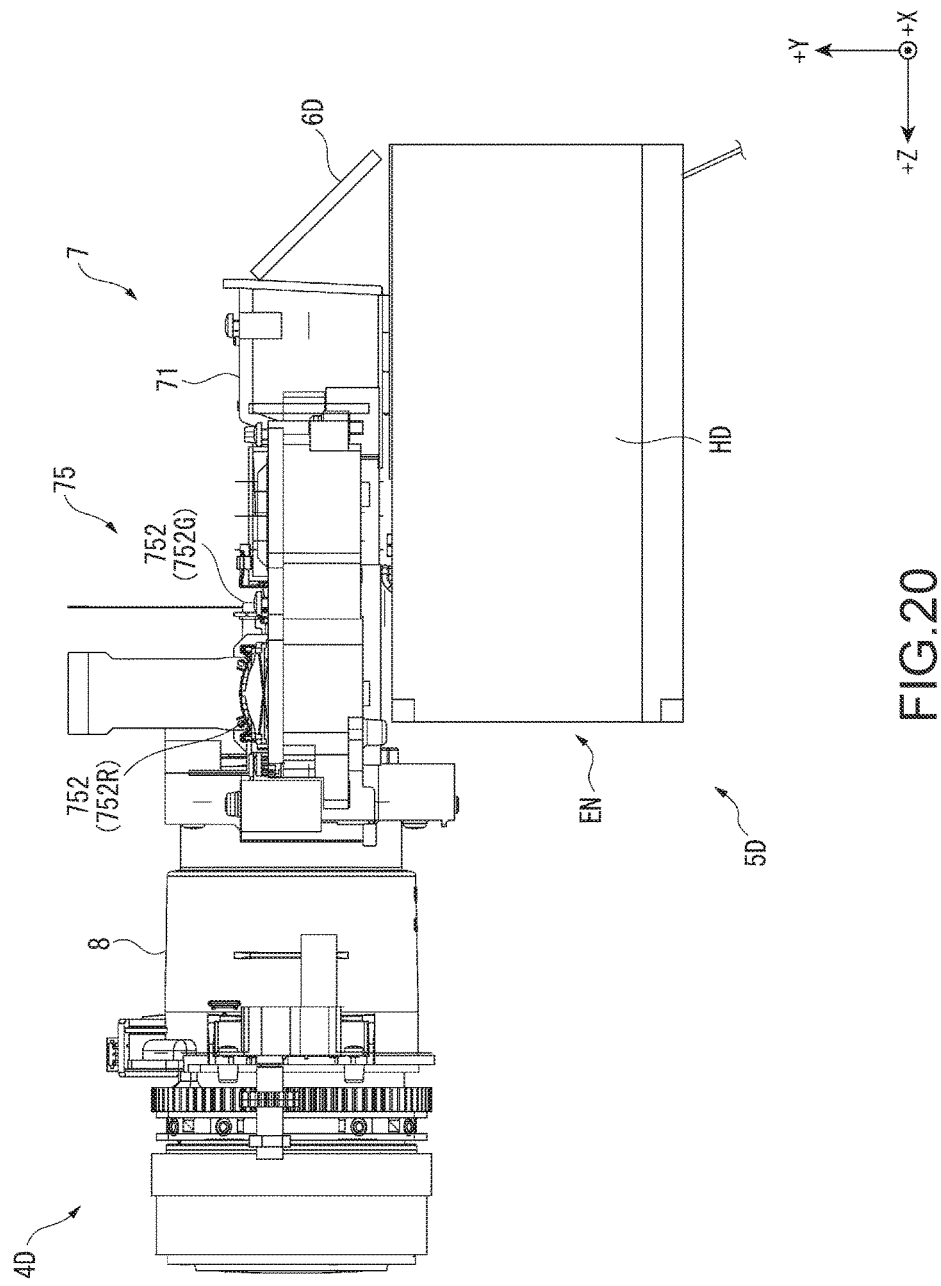
FIG. 20 is a right side view showing an image projection device provided to a projector according to a fourth embodiment of the invention.

FIG. 20 is a side view (a right side view) of an image projection device 4D provided to the projector according to the present embodiment viewed from the +X direction side.

The projector according to the present embodiment has substantially the same configuration and functions as those of the projector 1 described above except the point that the image projection device 4D is provided instead of the image projection device 4A.

Further, as shown in FIG. 20, the image projection device 4D has substantially the same configuration as that of the image projection device 4A described above except the point that an illumination device 5D and a light guide device 6D are provided instead of the illumination device 5A and the light guide device 6. Specifically, in the image projection device 4D, there is provided a two-story structure in which the illumination device 5D is disposed in the first floor part, and the light guide device 6D, the image forming device 7 and the projection optical device 8 are disposed in the second floor part. Further, the image forming device 7 is disposed so that at least a part of the image forming device 7 overlaps at least a part of the illumination device 5D in the +Y direction.

Figure 21:
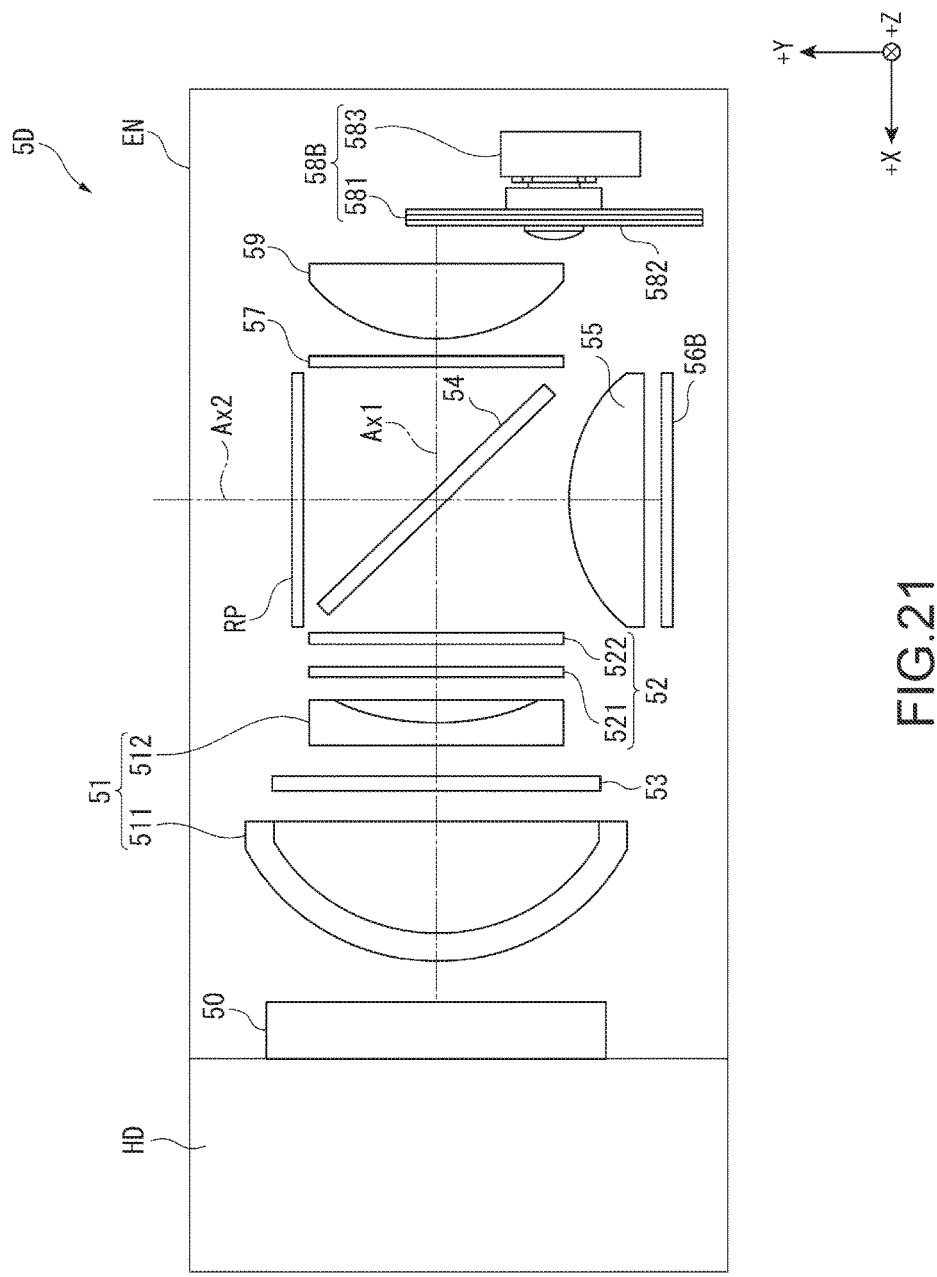
FIG. 21 is a schematic diagram showing a configuration of an illumination device in the fourth embodiment.

Hereinafter, the configuration of the illumination device 5D and the light guide device 6D will be described in detail.
Configuration of Light Guide Device The light guide device 6D is formed of a single reflecting member, and the light guide device 6D is disposed at a position where the light guide device 6D crosses the illumination optical axis Ax2 described later. The light guide device 6D reflects the illumination light, which enters the light guide device 6D from the illumination device 5D along the +Y direction, toward the +Z direction to enter the image forming device 7.
Configuration of Illumination Device FIG. 21 is a schematic diagram showing a configuration of the illumination device 5D in the case of being viewed from the −Z direction side.

Similarly to the illumination devices 5A through 5C described above, the illumination device 5D emits the illumination light entering the image forming device 7 located on the +Y direction side via the light guide device 6D similarly located on the +Y direction side. As shown in FIG.

21, the illumination device 5D is provided with the light source section 50, the afocal optical element 51, the homogenizer optical element 52, the first retardation element 53, the separating/combining element 54, the first light collection element 55, the wavelength conversion element 56B, the second retardation element 57, the diffusely reflecting device 58B, the second light collection element 59, and the retardation element RP, the housing EN for housing these constituents inside, and the radiation member HD. Therefore, the illumination device 5D has substantially the same configuration as that of the illumination device 5B, but the optical components are arranged so that the emission direction of the illumination light corresponds to the +Y direction.

Specifically, the light source section 50, the afocal optical element 51, the homogenizer optical element 52, the first retardation element 53, the separating/combining element 54, the second retardation element 57, the second light collection element 59 and the diffusely reflecting device 58B are arranged on the illumination optical axis Ax1 parallel to the +X direction in this order from the +X direction side. It should be noted that the first retardation element 53 is disposed between the lenses 511, 512 of the afocal optical element 51 similarly to the case in the illumination device 5B described above.

Further, the wavelength conversion element 56B, the first light collection element 55, the separating/combining element 54 and the retardation element RP are arranged on the illumination optical axis Ax2 parallel to the +Y direction in this order from the −Y direction side. Further, the separating/combining element 54 is disposed at the crossing region between the illumination optical axes Ax1, Ax2 so as to be tilted at an angle of 45° from each of the illumination optical axes Ax1, Ax2.

It should be noted that similarly to the above, the illumination optical axes Ax1, Ax2 are not required to be perpendicular to each other, but is only required to cross each other.

In such an illumination device 5D, the source light as the blue light emitted from the light source section 50 toward the −X direction passes through the afocal optical element 51, the first retardation element 53, and the homogenizer optical element 52, and then enters the separating/combining element 54 similarly to the case in the illumination device 5B.

Among the source light having entered the separating/combining element 54, the first source light as the s-polarized light is reflected toward the −Y direction side, and then enters the wavelength conversion element 56B via the first light collection element 55 along the illumination optical axis Ax2. The fluorescence generated by the wavelength conversion element 56B propagates toward the +Y direction side along the illumination optical axis Ax2, and then enters the separating/combining element 54 passing through the first light collection element 55 once again.

In contrast, the second source light as the p-polarized light passes through the separating/combining element 54 in the −X direction, and then enters the light diffusion section 582 of the diffusely reflecting device 58B via the second retardation element 57 and the second light collection element 59. The second source light having been diffusely reflected by the light diffusion section 582 propagates toward the +X direction side along the illumination optical axis Ax1, then passes through the second light collection element 59 and the second retardation element 57 once again, and then enters the separating/combining element 54 as the second source light as the s-polarized light.

Due to the characteristics described above, the separating/combining element 54 transmits the fluorescence, which enters the separating/combining element 54 from the −Y direction side, toward the +Y direction, and reflects the second source light as the s-polarized light, which enters the separating/combining element 54 from the −X direction side, toward the +Y direction side.

The fluorescence and the second source light are converted into circularly-polarized light in the process of passing through the retardation element RP in the +Y direction, and are emitted toward the light guide device 6D (see FIG. 20) as the illumination light. Further, the illumination light is reflected by the light guide device 6D toward the +Z direction side to enter the image forming device 7 (see FIG. 20).

Also in such an illumination device 5D, since the light source section 50 is located on the +X direction side in the housing EN, the radiation member HD (the radiation section) for radiating the heat transferred from the light source section 50 is disposed adjacent to the housing EN on the +X direction side.

Further, in the illumination device 5D, the light path length of the first source light from the separating/combining element 54 to the wavelength conversion element 56B and the light path length of the second source light from the separating/combining element 54 to the diffusely reflecting device 58B are the same. In contrast, since the light path length of the source light from the light source section 50 to the separating/combining element 54 is relatively long, in addition to the fact that the radiation member HD is disposed on the +X direction side with respect to the housing EN, the illumination device 5D is configured to have a roughly rectangular solid shape larger in dimension in the +X direction than in the +Y direction.

Advantages of Fourth Embodiment

According to the projector related to the present embodiment described hereinabove, in addition to the advantages substantially the same as those of the projector 1 described above, the following advantages can be obtained.

The illumination device 5D emits the illumination light toward the +Y direction side on which the light guide device 6D and the image forming device 7 are located with respect to the illumination device 5D. According to the above, it is possible to simplify the configuration of the light guide device 6D adapted to guide the illumination light to the image forming device 7. Specifically, it is possible to guide the illumination light to the image forming device 7 by the light guide device 6D configured including the single reflecting member without adopting the light guide device 6 having the two reflecting members 61, 62. Therefore, it is possible to simplify the configuration of the image projection device 4D, and by extension, the configuration of the projector.

Modifications of Embodiments

The invention is not limited to the embodiments described above, but includes modifications, improvements, and so on in the range where the advantages of the invention can be achieved.

In each of the embodiments described above, it is assumed that the illumination devices 5A through 5D and the image forming device 7 are disposed so as to overlap each other in the +Y direction. Specifically, the image projection devices 4A through 4D are assumed to be configured to have the two-story structure in which one of the illumination devices 5A through 5D is disposed in the first floor part, and the image forming device 7 is disposed in the second floor part. The illumination devices 5A through 5D and the image forming device 7 are not required to completely overlap each other when being viewed from the +Y direction side. Specifically, it is sufficient that at least a part of either one of the illumination devices 5A through 5D and at least a part of the image forming device 7 overlap each other in the +Y direction.

In each of the embodiments described above, there is cited an example in which the +Z direction is defined as the first direction, the +X direction is defined as the second direction, and the +Y direction is defined as the third direction. However, this example is not a limitation, but it is also possible to define other directions as the first through third directions. For example, it is also possible to define the +Z direction as the first direction, the +X direction as the third direction, and the +Y direction as the second direction.

Further, in each of the embodiments described above, the +Z direction, the +X direction and the +Y direction are defined using the top surface part 21, the bottom surface part 22, the front surface part 23, the back surface part 24, the right side surface part 25 and the left side surface part 26 of the exterior housing 2 as a reference. However, this is not a limitation, and it is also possible to define the +Z direction, the +X direction and the +Y direction, and by extension, the first through third directions based on other standards.

Further, the exterior housing 2 is not limited to the roughly rectangular solid shape, but can also be formed to have other shapes such as a columnar shape (a cylindrical shape).

In each of the embodiments described above, as the configuration and the layout of the image forming device, there are illustrated the configuration and the layout of the image forming device 7 shown in FIG. 4 and FIG. 11. However, this is not a limitation, but it is also possible to adopt image forming devices having other configurations and layout. For example, it is also possible to eliminate at least a part of the optical components constituting the image forming device 7, or it is also possible to include some other optical components. Further, for example, it is also possible to adopt an image forming device in which the homogenizing device 72 is disposed so that the propagation direction of the light beam passing through the homogenizing device 72 is parallel to the +X direction, and the blue light separated by the dichroic mirror 731 propagates toward the +Z direction, and the green light and the red light pass through the dichroic mirror 731 along the +X direction.

In each of the embodiments described above, as the configuration and the layout of the illumination device, there are illustrated the configuration and the layout of each of the illumination devices 5A through 5D shown in FIG. 10, FIG. 15, FIG. 19 and FIG. 21. However, this is not a limitation, but it is also possible to adopt illumination devices having other configurations and layout. For example, it is also possible to eliminate at least a part of the optical components constituting each of the illumination devices 5A through 5D, or it is also possible to include some other optical components.

In the first and second embodiments described above, it is assumed that the illumination optical axis Ax2 set in the illumination devices 5A, 5B and the illumination optical axis Ax4 set in the image forming device 7 overlap each other viewed from the +Y direction side. Further, in the third embodiment described above, it is assumed that the illumination optical axis Ax1 set in the illumination device 5C and the illumination optical axis Ax4 overlap each other viewed from the +Y direction side. However, this is not a limitation, but it is not required for the illumination optical axis set in the illumination device and the illumination optical axis set in the image forming device to overlap each other viewed from the +Y direction side. Further, it is also possible for other illumination optical axes in the illumination device and other illumination optical axes in the image forming device to be set so as to overlap each other viewed from the +Y direction side.

In each of the embodiments described above, it is assumed that the homogenizing device 72 is provided to the image forming device 7 disposed on the +Y direction side with respect to the illumination devices 5A through 5D. In other words, it is assumed that the homogenizing device 72 is disposed in the second floor part in the image projection devices 4A through 4D having the two-story structure. However, this is not a limitation, but it is also possible for the homogenizing device 72 to be located in the first floor part. In this case, there is illustrated a configuration in which the homogenizing device 72 is disposed between the illumination device and the light guide device.

According to such a configuration, it is possible to exert the advantages described above obtained by providing the homogenizing device 72. Besides the above, in the case of the configuration in which the light guide device guides the illumination light from the illumination device to the image forming device using reflection, by the homogenizing device 72 uniforming the illumination light to the polarized light high in reflection efficiency in the light guide device, it is possible to improve the utilization efficiency of the light in the image forming device.

In the first embodiment described above, it is assumed that the wavelength conversion section 562 and the light diffusion section 563 are located on the same substrate 561. However, this is not a limitation, but it is also possible for the wavelength conversion section 562 and the light diffusion section 563 to be located on respective substrates separate from each other. In this case, it is also possible to provide a rotating device for rotating the respective substrates.

In the third embodiment described above, it is assumed that the first light source section 50C1 and the second light source section 50C2 are respectively supported by the radiation member HD. However, this is not a limitation, but it is also possible to support the first light source section 50C1 and the second light source section 50C2 with respective members separate from each other, or it is also possible to dispose the radiation member HD for each of the light source sections 50C1, 50C2.

In each of the embodiments, it is assumed that the retardation element RP is located on the incident side of the light guide devices 6, 6D. However, this is not a limitation, and it is also possible for the retardation element RP to be disposed on the emission side of the light guide device, and the incident side of the polarization conversion element 723, for example, between the light guide device and the first lens array 721.

In each of the embodiments described above, as the first color separation element and the second color separation element, there are illustrated the dichroic mirrors 731, 732. However, this is not a limitation, but these color separation elements can also be other configurations providing it is possible to separate a plurality of colored light beams from the light beam entering the color separation element.

Further, the plurality of colored light beams separated by the color separation device is not limited to the blue light beam, the green light beam, and the red light beam, but can also be other colored light beams.

Further, in each of the embodiments described above, the blue light beam is defined as the first colored light beam, the green light beam is defined as the second colored light beam, and the red light beam is defined as the third colored light beam. However, this is not a limitation, but it is also possible to adopt, for example, an image forming device having the relay device 74 for transmitting the blue light beam, and define the red light beam as the first colored light beam, the green light beam as the second colored light beam, and the blue light beam as the third colored light beam.

In each of the embodiments described above, it is assumed that the projector is equipped with the three light modulation devices 752 (752B, 752G, and 752R). However, this is not a limitation, and the invention can also be applied to a projector equipped with two or less, or four or more light modulation devices 752.

In each of the embodiments, it is assumed that the light modulation devices 752 are each configured including the transmissive liquid crystal panel having the plane of incidence of light and the light emission surface different from each other, and the liquid crystal light valve having the incident side polarization plate and the emission side polarization plate. However, this is not a limitation, but it is possible for the liquid crystal panels to be reflective liquid crystal panels, in which the plane of incidence of light and the light emission surface are the same. Further, it is also possible for the light modulation devices 752 to be additionally provided with other optical elements such as an optical compensating plate.

Further, it is also possible to use a light modulation device other than the liquid crystal, such as a device using a micromirror such as a digital micromirror device (DMD) providing the light modulation device is capable of modulating the incident light beam to form the image corresponding to the image information.

The entire disclosure of Japanese Patent Application No. 2017-149709, filed on Aug. 2, 2017 is expressly incorporated by reference herein.

What is claimed is:

1. A projector comprising:
   an illumination device adapted to emit an illumination light beam;
   an image forming device adapted to modulate the illumination light beam emitted from the illumination device to form an image, the image forming device including:
      a color separation device adapted to separate the illumination light beam entering the color separation device into a plurality of colored light beams, the color separation device including:
         a first color separation element adapted to separate the illumination light beam into a first colored light beam propagating in a first direction and another colored light beam propagating in a second direction out of the plurality of colored light beams; and
         a second color separation element adapted to separate the other colored light beam separated by the first color separation element into a second colored light beam propagating in the first direction and a third colored light beam propagating in the second direction;
      a plurality of light modulation devices disposed corresponding to the plurality of colored light beams separated by the color separation device; and
      a color combining device adapted to combine the plurality of colored light beams entering the color combining device from the plurality of light modulation devices with each other to form the image;
   a projection optical device adapted to project the image formed by the image forming device; and
   a light guide device adapted to guide the illumination light beam emitted from the illumination device to the image forming device,
   wherein defining two directions which are propagation directions of the illumination light beam propagating inside the image forming device, and cross each other as the first direction and the second direction, the image forming device is disposed so that a part of the image forming device overlaps a part of the illumination device in a third direction perpendicular to each of the first direction and the second direction.

2. The projector according to claim 1, wherein
   the first direction is parallel to a projection direction of the image by the projection optical device viewed along the third direction, and
   the light guide device emits the illumination light beam which has been emitted from the illumination device toward an opposite direction side to the first direction toward a first direction side to guide the illumination light beam to the image forming device.

3. The projector according to claim 2, wherein
   the illumination device includes
      a light source section adapted to emit a source light beam,
      a separating/combining section adapted to separate the source light beam into a first source light beam and a second source light beam,
      a wavelength conversion section adapted to emit a converted light beam obtained by wavelength-converting the first source light beam separated by the separating/combining section,
      a light diffusion section adapted to diffuse the second source light beam separated by the separating/combining section, and
      a radiation section connected to the light source section and adapted to radiate heat of the light source section,
   the light source section emits the source light beam in an opposite direction to the second direction,
   the separating/combining section emits the illumination light beam obtained by combining the converted light beam emitted from the wavelength conversion section and the second source light beam diffused by the light diffusion section with each other in an opposite direction to the first direction toward the light guide device, and
   the radiation section is located on a second direction side with respect to the light source section.

4. The projector according to claim 3, further comprising:
   a second source light beam reflecting member located on the opposite direction side to the second direction with respect to the separating/combining section, and adapted to reflect the second source light beam which has been separated by the separating/combining section and propagates in the opposite direction to the second direction toward the first direction,
   wherein the wavelength conversion section and the light diffusion section are located on a same substrate located in the first direction with respect to the separating/combining section and the second source light beam reflecting member, and
   the separating/combining section emits,
      the first source light beam toward the first direction, the second source light beam toward the opposite direction to the second direction, the converted light beam entering the separating/combining section in the opposite direction to the first direction from the wavelength conversion section toward the opposite direction to the first direction, and the second source light beam entering the separating/combining section in the second direction from the light diffusion section via the second source light beam reflecting member toward the opposite direction to the first direction.

5. The projector according to claim 4, further comprising:
a rotating device adapted to rotate the same substrate around a rotational axis parallel to the first direction.

6. The projector according to claim 3, wherein
the wavelength conversion section is located in the first direction with respect to the separating/combining section, the light diffusion section is located in the opposite direction to the second direction with respect to the separating/combining section, and the separating/combining section emits,
the first source light beam toward the first direction,
the second source light beam toward the opposite direction to the second direction,
the converted light beam entering the separating/combining section in the opposite direction to the first direction from the wavelength conversion section toward the opposite direction to the first direction, and
the second source light beam entering the separating/combining section in the second direction from the light diffusion section toward the opposite direction to the first direction.

7. The projector according to claim 2, wherein
the illumination device includes
a first light source section adapted to emit a blue light beam in an opposite direction to the first direction,
a second light source section adapted to emit an excitation light beam in the opposite direction to the first direction,
a light diffusion section located in the opposite direction to the first direction with respect to the first light source section, and adapted to diffuse the blue light beam entering the light diffusion section,
a reflecting section located in the opposite direction to the first direction with respect to the second light source section, and adapted to reflect the excitation light beam entering the reflecting section toward an opposite direction to the second direction,
a light combining section located in the opposite direction to the first direction with respect to the light diffusion section, and adapted to emit the excitation light beam entering the light combining section via the reflecting section toward the opposite direction to the second direction,
a wavelength conversion section located in the opposite direction to the second direction with respect to the light combining section, and adapted to emit a converted light beam obtained by wavelength-converting the excitation light beam entering the wavelength conversion section from the light combining section, and
a radiation section located in the first direction with respect to the first light source section and the second light source section, and adapted to radiate heat transferred from the first light source section and the second light source section, and the light combining section emits the blue light beam entering the light combining section from the light diffusion section and the converted light beam entering the light combining section from the wavelength conversion section toward the opposite direction to the first direction.

8. The projector according to claim 1, wherein the image forming device is provided with a homogenizing device disposed on a light path of the illumination light beam entering the color separation device from the light guide device, and adapted to homogenize an illuminance distribution of the illumination light beam entering the homogenizing device from the light guide device and uniform a polarization direction.

9. The projector according to claim 1, further comprising:
a homogenizing device disposed on a light path of the illumination light beam entering the light guide device from the illumination device, and adapted to homogenize an illuminance distribution of the illumination light beam entering the homogenizing device from the illumination device and uniform a polarization direction.

10. The projector according to claim 1, further comprising:
a first reflecting member adapted to reflect the third colored light beam which has been separated by the color separation device and propagates in the second direction toward the first direction; and
a second reflecting member adapted to reflect the third colored light beam which has been reflected by the first reflecting member and propagates in the first direction toward an opposite direction to the second direction,
wherein the color separation device includes a third reflecting member adapted to reflect the first colored light beam which propagates from the first color separation element in the first direction toward the second direction,
the plurality of light modulation devices includes
a first light modulation device adapted to modulate the first colored light beam entering the first light modulation device along the second direction,
a second light modulation device adapted to modulate the second colored light beam entering the second light modulation device along the first direction, and
a third light modulation device adapted to modulate the third colored light beam entering the third light modulation device along the opposite direction to the second direction, and
the color combining device includes
a first plane of incidence which crosses the second direction, and which the first colored light beam modulated by the first light modulation device enters,
a second plane of incidence which crosses the first direction, and which the second colored light beam modulated by the second light modulation device enters,
a third plane of incidence which crosses the second direction, and which the third colored light beam modulated by the third light modulation device enters, and
an emission surface located on an opposite side to the second plane of incidence, and adapted to emit the image obtained by combining the first colored light beam, the second colored light beam, and the third colored light beam entering the color combining device with each other in the first direction toward the projection optical device.

11. The projector according to claim 1, wherein the illumination device includes
    a first light source section adapted to emit a blue light beam in an opposite direction to the first direction,
    a second light source section adapted to emit an excitation light beam in the opposite direction to the first direction,
    a light diffusion section located in the opposite direction to the first direction with respect to the first light source section, and adapted to diffuse the blue light beam entering the light diffusion section,
    a reflecting section located in the opposite direction to the first direction with respect to the second light source section, and adapted to reflect the excitation light beam entering the reflecting section toward an opposite direction to the second direction,
    a light combining section located in the opposite direction to the first direction with respect to the light diffusion section, and adapted to emit the excitation light beam entering the light combining section via the reflecting section toward the opposite direction to the second direction,
    a wavelength conversion section located in the opposite direction to the second direction with respect to the light combining section, and adapted to emit a converted light beam obtained by wavelength-converting the excitation light beam entering the wavelength conversion section from the light combining section, and
    a radiation section located in the first direction with respect to the first light source section and the second light source section, and adapted to radiate heat transferred from the first light source section and the second light source section, and
    the light combining section emits the blue light beam entering the light combining section from the light diffusion section and the converted light beam entering the light combining section from the wavelength conversion section toward the opposite direction to the first direction.

12. The projector according to claim 1, wherein the light guide device includes a reflecting member adapted to reflect the illumination light beam entering the light guide device from the illumination device toward the image forming device.

13. A projector comprising:
    an illumination device adapted to emit an illumination light beam, the illumination device including:
        a light source section adapted to emit a source light beam;
        a separating/combining section adapted to separate the source light beam into a first source light beam and a second source light beam;
        a wavelength conversion section adapted to emit a converted light beam obtained by wavelength-converting the first source light beam separated by the separating/combining section;
        a light diffusion section adapted to diffuse the second source light beam separated by the separating/combining section; and
        a radiation section connected to the light source section and adapted to radiate heat of the light source section;
    an image forming device adapted to modulate the illumination light beam emitted from the illumination device to form an image;
    a projection optical device adapted to project the image formed by the image forming device; and
    a light guide device adapted to guide the illumination light beam emitted from the illumination device to the image forming device,
    wherein defining two directions which are propagation directions of the illumination light beam propagating inside the image forming device, and cross each other as a first direction and a second direction, the image forming device is disposed so that a part of the image forming device overlaps a part of the illumination device in a third direction perpendicular to each of the first direction and the second direction,
    the light source section emits the source light beam in an opposite direction to the second direction,
    the separating/combining section emits the illumination light beam obtained by combining the converted light beam emitted from the wavelength conversion section and the second source light beam diffused by the light diffusion section with each other in an opposite direction to the first direction toward the light guide device, and
    the radiation section is located on a second direction side with respect to the light source section.

14. The projector according to claim 13, further comprising:
    a second source light beam reflecting member located on an opposite direction side to the second direction with respect to the separating/combining section, and adapted to reflect the second source light beam which has been separated by the separating/combining section and propagates in the opposite direction to the second direction toward the first direction,
    wherein the wavelength conversion section and the light diffusion section are located on a same substrate located in the first direction with respect to the separating/combining section and the second source light beam reflecting member, and
    the separating/combining section emits,
        the first source light beam toward the first direction,
        the second source light beam toward the opposite direction to the second direction,
        the converted light beam entering the separating/combining section in the opposite direction to the first direction from the wavelength conversion section toward the opposite direction to the first direction, and
        the second source light beam entering the separating/combining section in the second direction from the light diffusion section via the second source light beam reflecting member toward the opposite direction to the first direction.

15. The projector according to claim 14, further comprising:
    a rotating device adapted to rotate the same substrate around a rotational axis parallel to the first direction.

16. The projector according to claim 13, wherein
    the wavelength conversion section is located in the first direction with respect to the separating/combining section,
    the light diffusion section is located in the opposite direction to the second direction with respect to the separating/combining section, and
    the separating/combining section emits, the first source light beam toward the first direction, the second source light beam toward the opposite direction to the second direction, the converted light beam entering the separating/combining section in the opposite direction to the first direction from the wavelength conversion section toward the opposite direction to the first direction, and the second source light beam entering the separating/combining section in the second direction from the light diffusion section toward the opposite direction to the first direction.

\* \* \* \* \*